US012112444B2

(12) United States Patent
Kim et al.

(10) Patent No.: US 12,112,444 B2
(45) Date of Patent: Oct. 8, 2024

(54) ELECTRONIC DEVICE AND GRAPHIC OBJECT CONTROL METHOD OF ELECTRONIC DEVICE

(71) Applicant: Samsung Electronics Co., Ltd., Gyeonggi-do (KR)

(72) Inventors: Yejin Kim, Gyeonggi-do (KR); Yoonjeong Kang, Gyeonggi-do (KR); Iseul Yu, Gyeonggi-do (KR); Heeyul Kim, Gyeonggi-do (KR); Sanghyun Park, Gyeonggi-do (KR); Jongil Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 17/426,538

(22) PCT Filed: Jan. 22, 2020

(86) PCT No.: PCT/KR2020/001104
§ 371 (c)(1),
(2) Date: Jul. 28, 2021

(87) PCT Pub. No.: WO2020/159147
PCT Pub. Date: Aug. 6, 2020

(65) Prior Publication Data
US 2022/0122309 A1 Apr. 21, 2022

(30) Foreign Application Priority Data
Jan. 28, 2019 (KR) ........................ 10-2019-0010405

(51) Int. Cl.
*G06T 19/20* (2011.01)
*G06T 7/70* (2017.01)
(Continued)

(52) U.S. Cl.
CPC ................ *G06T 19/20* (2013.01); *G06T 7/70* (2017.01); *G06T 13/40* (2013.01); *G06T 15/205* (2013.01);
(Continued)

(58) Field of Classification Search
None
See application file for complete search history.

(56) References Cited

U.S. PATENT DOCUMENTS 10,586,369 B1 * 3/2020 Roche ..................... G10L 13/00
2007/0168357 A1 * 7/2007 Mo ..................... G06F 16/9535
(Continued)

FOREIGN PATENT DOCUMENTS

GB 2488237 8/2012
KR 1020090028713 3/2009
(Continued)

OTHER PUBLICATIONS

PCT/ISA/210 Search Report issued on PCT/KR2020/001104, Nov. 27, 2020, pp. 4.
(Continued)

*Primary Examiner* — Kee M Tung
*Assistant Examiner* — Jed-Justin Imperial
(74) *Attorney, Agent, or Firm* — The Farrell Law Firm, P.C.

(57) ABSTRACT

An electronic device includes a camera, a display, and a processor, wherein the processor is configured to acquire an image using the camera, determine a 3D graphic object corresponding to an object included in the acquired image, and apply the determined 3D graphic object to a 3D avatar and display the same.

14 Claims, 36 Drawing Sheets

(51) Int. Cl.

| | |
|---|---|
| ***G06T 13/40*** | (2011.01) |
| ***G06T 15/20*** | (2011.01) |
| ***G06T 19/00*** | (2011.01) |
| ***G06V 20/30*** | (2022.01) |
| ***G06V 20/64*** | (2022.01) |
| ***G06V 40/10*** | (2022.01) |
| ***G06V 40/16*** | (2022.01) |

(52) U.S. Cl.

CPC ............ *G06T 19/006* (2013.01); *G06V 20/30* (2022.01); *G06V 40/161* (2022.01); *G06V 40/169* (2022.01); *G06T 2207/30201* (2013.01); *G06V 20/647* (2022.01); *G06V 40/103* (2022.01); *G06V 40/16* (2022.01); *G06V 40/172* (2022.01)

(56) References Cited

U.S. PATENT DOCUMENTS

| | | | | |
|---|---|---|---|---|
| 2008/0097975 | A1 | 4/2008 | Guay et al. | |
| 2008/0201638 | A1* | 8/2008 | Nair | H04W 4/029 715/706 |
| 2008/0222262 | A1 | 9/2008 | Oh et al. | |
| 2009/0063283 | A1* | 3/2009 | Kusumoto | G06Q 30/02 705/14.25 |
| 2011/0074822 | A1* | 3/2011 | Chang | G06F 1/1626 345/660 |
| 2012/0113106 | A1 | 5/2012 | Choi et al. | |
| 2015/0022444 | A1* | 1/2015 | Ooi | G06V 20/20 345/156 |
| 2015/0193522 | A1* | 7/2015 | Choi | G06Q 10/1091 707/737 |
| 2015/0279098 | A1 | 10/2015 | Kim et al. | |
| 2016/0232708 | A1 | 8/2016 | Kim et al. | |
| 2017/0352091 | A1 | 7/2017 | Chen et al. | |
| 2017/0287060 | A1* | 10/2017 | Choi | G06T 15/04 |
| 2018/0091732 | A1* | 3/2018 | Wilson | G06T 7/70 |
| 2018/0197331 | A1 | 7/2018 | Chen et al. | |
| 2018/0260843 | A1* | 9/2018 | Hiranandani | G06Q 30/0255 |
| 2018/0267993 | A1 | 9/2018 | Lee et al. | |
| 2019/0311540 | A1 | 10/2019 | Kovacevitch et al. | |
| 2019/0371031 | A1* | 12/2019 | Callegari | H04L 67/303 |

FOREIGN PATENT DOCUMENTS

| | | |
|---|---|---|
| KR | 10-0993801 | 11/2010 |
| KR | 10-1514327 | 4/2015 |
| KR | 1020170112267 | 10/2017 |
| KR | 10-1789360 | 11/2017 |
| KR | 10-1892735 | 8/2018 |
| KR | 1020180106221 | 10/2018 |
| KR | 10-2020-0035549 | 4/2020 |
| KR | 10-2012-0006610 | 1/2021 |
| WO | WO 2008/015571 | 2/2008 |
| WO | WO 2015/020703 | 2/2015 |
| WO | WO 2017/203262 | 11/2017 |

OTHER PUBLICATIONS

PCT/ISA/237 Written Opinion issued on PCT/KR2020/001104, Apr. 27, 2020, pp. 4.

Roy Shilkrot et al., "Garment Personalization via Identity Transfer", IEEE Computer Graphics and Applications, Jul./Aug. 2013, 11 pages.

European Search Report dated Mar. 28, 2022 issued in counterpart application No. 20747850.4-1230, 9 pages.

Korean Office Action dated Apr. 14, 2023 issued in counterpart application No. 10-2019-0010405, 13 pages.

Korean Office Action dated Oct. 28, 2023 issued in counterpart application No. 10-2019-0010405, 10 pages.

European Search Report dated Mar. 7, 2024 issued in counterpart application No. 20747850.4-1207, 5 pages.

* cited by examiner

ELECTRONIC DEVICE AND GRAPHIC OBJECT CONTROL METHOD OF ELECTRONIC DEVICE

CROSS-REFERENCE TO RELATED APPLICATION(S)

This application is a National Phase Entry of International Application No. PCT/KR2020/001104, which was filed on Jan. 22, 2020, and claims priority to Korean Patent Application No. 10-2019-0010405 filed in the Korean Intellectual Property Office on Jan. 28, 2019, the contents of each of which are incorporated herein by reference.

BACKGROUND

1. Field

The present disclosure relates generally to an electronic device and a graphic object control method of an electronic device.

2. Description of Related Art

Electronic devices can photograph and recognize a user's face, thereby generating a three-dimensional (3D) avatar similar to the user. The electronic devices may provide various graphic items (e.g., clothes, glasses, or hats) to decorate the generated 3D avatar. However, since the various graphic items provided by the electronic devices are limited to specific types, there is a limit to decorating the 3D avatar with a graphic item corresponding to an item actually possessed by the user.

Therefore, it may be advantageous for an electronic device to provide a graphic item corresponding to an item possessed by a user of the electronic device using a 3D avatar.

SUMMARY

The present disclosure has been made to address the above-mentioned problems and disadvantages, and to provide at least the advantages described below.

According to an aspect of the disclosure, an electronic device includes a camera; a display; and a processor. The processor is configured to obtain an image using the camera; determine a 3D graphic object corresponding to an object included in the obtained image; and apply the determined 3D graphic object to a 3D avatar to display the 3D avatar.

According to another aspect of the disclosure, a graphic object control method of an electronic device includes obtaining an image using a camera; determining a 3D graphic object corresponding to an object included in the obtained image; and applying the determined 3D graphic object to a 3D avatar to display the 3D avatar.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
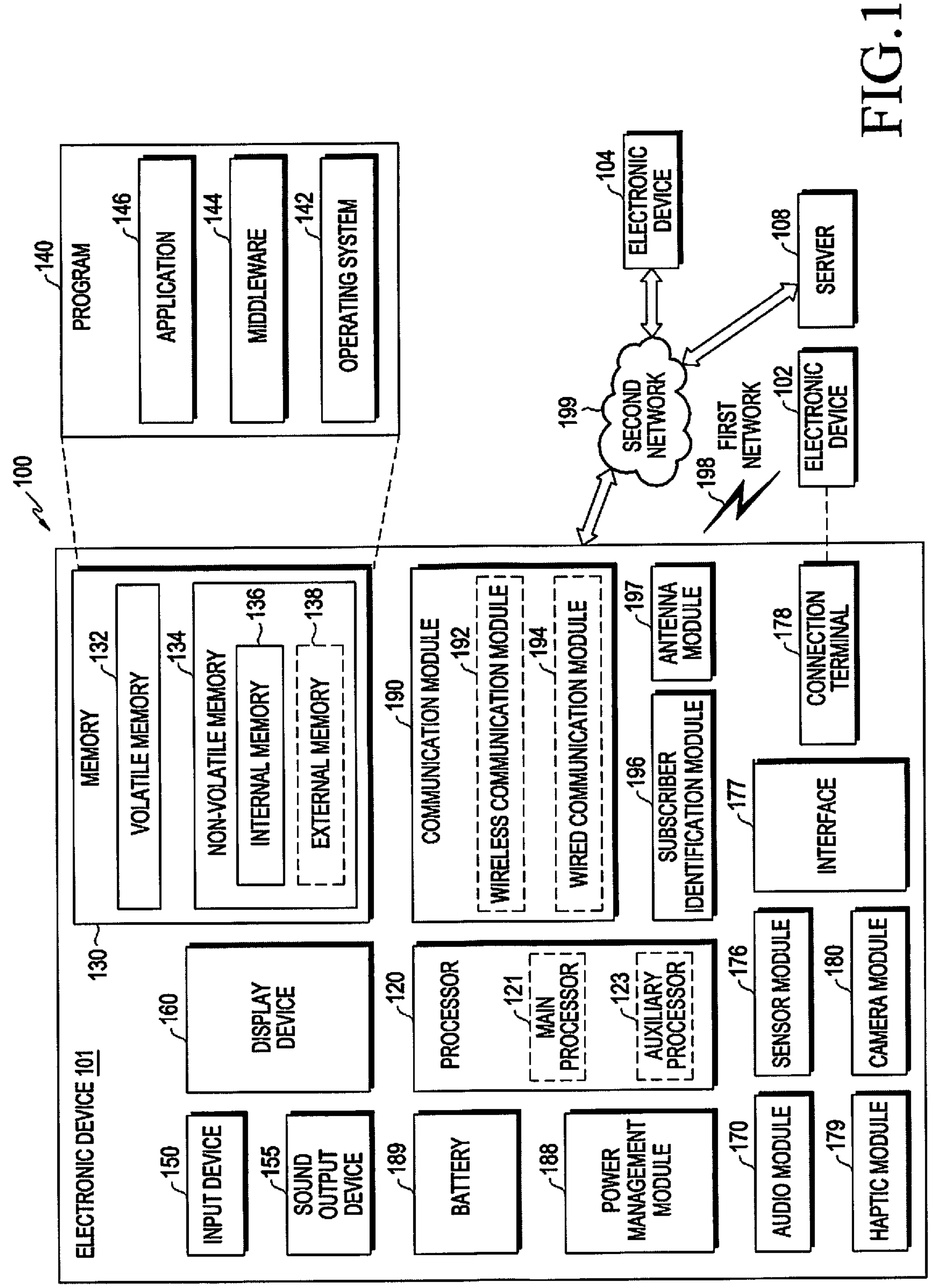
FIG. 1 is a block diagram illustrating an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments, a graphic item corresponding to an item of a user of an electronic device may be applied to a 3D avatar representing the user, thereby decorating the 3D avatar in a personalized manner.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, at least one of a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technology set forth herein to particular embodiments and include various changes, equivalents, and/or replacements for a corresponding embodiment. With regard to the description of the drawings, similar reference numerals may be used to refer to similar elements. It is to be understood that the terms of a singular form may include plural forms, unless the relevant context clearly means otherwise. As used herein, such expressions as "A or B," "at least one of A and/or B," "A, B, or C," or "at least one of A, B, and/or C" may include all possible combinations of the items enumerated together. As used herein, such expressions as "1st," "2nd," "first," or "second" and the like, may express their elements regardless of their order or importance and is only used to distinguish one element from another element and is not limited to the corresponding components. It is to be understood that if an element (e.g., a first element) is referred to "(operatively or communicatively) coupled with/to" or "connected to" another element (e.g., a second element), it means that the element may be coupled with the other element directly or via another element (e.g., a third element).

As used herein, the term "module" includes a unit configured in hardware, software, or firmware, and may interchangeably be used with other terms, for example, "logic," "logic block," "part," or "circuitry". A module may be a single integral component, or a minimum unit or part adapted to perform one or more functions. For example, the module may be configured as an application-specific integrated circuit (ASIC).

Various embodiments as set forth herein may be implemented as software (e.g., a program 140) including an instruction that is stored in a machine-readable storage medium (e.g., internal memory 136 or external memory 138) that is readable by a machine (e.g., a computer). The machine is a device which can invoke an instruction stored in the storage medium and can be operated according to the instruction invoked, and may include an electronic device (e.g., the electronic device 101) according to the disclosed embodiments. When the instruction is executed by a processor (e.g., the processor 120), the processor may perform a function corresponding to the command directly, or by using other components under the control of the processor. The instruction may include a code generated or executed by a complier or an interpreter. The machine-readable storage medium may be provided in the form of a non-transitory storage medium. Wherein, the term "non-transitory" does not include a signal, simply means that the storage medium is tangible, and does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., PlayStore™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) may include a single entity or multiple entities, and part of the above-described corresponding sub components may be omitted, or other sub components may be added to various embodiments. Alternatively or additionally, some components (e.g., modules or programs) may be integrated into a single component, and may still perform a function performed by each of the corresponding components in the same or similar manner as they are performed before the integration. According to various embodiments, operations performed by the module, the program, or another component may be carried out sequentially, in parallel, repeatedly, or heuristically, or at least some operations may be executed in a different order or omitted, or other operations may be added.

Figure 2:
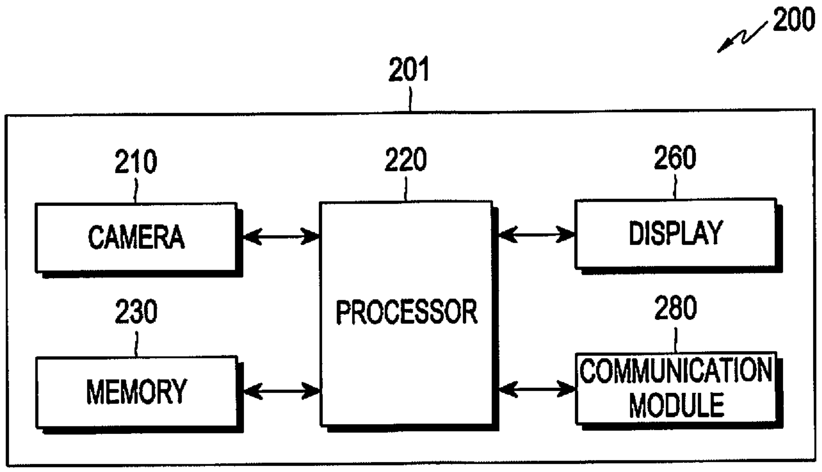
FIG. 2 is a block diagram schematically illustrating an electronic device, according to an embodiment.

FIG. 2 is a block diagram schematically illustrating an electronic device, according to an embodiment.

Referring to FIG. 2, the electronic device 201 may be configured to be substantially the same as or similar to the electronic device 101 described with reference to FIG. 1. For example, the electronic device 201 may be configured as a smartphone or a tablet PC.

The electronic device 201 includes a camera 210, a processor 220, a memory 230, a display 260, and a communication module 280.

The camera 210 may photograph at least a body part of a user. For example, the camera 210 may be configured to be substantially the same as or similar to the camera module 180 described with reference to FIG. 1.

The camera 210 may capture an image including at least one object.

The at least one object may include an object (e.g., clothes or an accessory) worn on the body part of the user and a graphic image (e.g., a tattoo) drawn on the body part of the user.

The processor 220 may control the overall operation of the electronic device. For example, the processor 220 may be configured to be substantially the same as or similar to the processor 120 described with reference to FIG. 1.

The processor 220 may obtain an image using the camera 210, may apply a 3D graphic object corresponding to an object included in the obtained image to a 3D avatar, and may display the 3D avatar. For example, when capturing an image including a bag that the user is currently wearing on a shoulder, the processor 220 may detect a 3D graphic having the same type, color, and brand as those of the bag, may apply the 3D graphic to a 3D graphic avatar representing the user, and may display the 3D avatar.

The processor 220 may determine the position of the object included in the obtained image, may apply the 3D graphic object to the position of the 3D avatar corresponding to the position of the object, and may display the 3D avatar. For example, the processor 220 may equally apply the 3D object corresponding to the bag that the user is currently wearing on the user's shoulder to a shoulder of the 3D avatar and may display the 3D avatar.

The processor 220 may obtain an image including an object using the camera 210, may analyze the object included in the obtained image, and may determine a 3D graphic object corresponding to the object from the memory 230 or a server 108. The processor 220 may analyze the object included in the image using an object analysis algorithm, thereby identifying category information and attribute information about the object. The attribute information may include type information, color information, add-on information, and brand information. The processor 220 may determine a category database (DB) corresponding to the identified category information about the object among a plurality of category DBs stored in the memory 230 or the server 108 and may detect a 3D graphic object satisfying the attribute information about the object among a plurality of 3D graphic objects stored in the determined category DB. For example, as a result of analyzing the object included in the image using the object analysis algorithm, the processor 220 may identify the category information about the object as "bag" and the attribute information about the object as "shoulder bag" (type information), "white and black lines" (color information), "badge" (add-on information), and "Smile"™ (brand information). The processor 220 may determine a bag category DB among the plurality of category DBs and may detect a 3D graphic object satisfying the attribute information about the object including "shoulder bag" (type information), "white and black lines" (color information), "badge" (add-on information), and "Smile"™ (brand information) from the bag category DB.

When personalization item generation is selected while the 3D avatar representing the user of the electronic device is being displayed, the processor 220 may obtain an image using the camera 210, may determine a 3D graphic object corresponding to the object included in the obtained image, may apply the determined 3D graphic object to the 3D avatar, and may display the 3D avatar. The processor 220 may store the determined 3D graphic object as a personalization item of the 3D avatar.

The processor 220 may provide an edit menu for editing the 3D graphic object corresponding to the object included in the obtained image. The processor 220 may provide the edit menu to enable the user to edit the 3D graphic object corresponding to the object included in the image.

The processor 220 may provide the edit menu for editing the 3D graphic object while the 3D avatar having the 3D graphic object applied thereto is being displayed. The processor 220 may provide the edit menu to enable the user to adjust the position or size of the 3D graphic object applied to the 3D avatar.

The processor 220 may obtain an image including a body part using the camera 210, may obtain a graphic image drawn on the body part, may apply the graphic image to the 3D avatar, and may display the 3D avatar. For example, when capturing an image including a tattoo on the right arm, the processor 220 may apply the tattoo to the right arm of the 3D avatar representing the user and may display the 3D avatar.

The processor 220 may identify the body part in the image, may apply the graphic image to a portion of the 3D avatar corresponding to the body part, and may display the 3D avatar.

The processor 220 may detect the distribution of skin color and the curvature of a line from the image using an object analysis algorithm, and may determine that the body part is the left arm based on the detected distribution of the skin color and the detected curvature of the line. The processor 220 may analyze a tattoo drawn on the left arm of the body using the object analysis algorithm to detect the line drawing of the tattoo and may determine a graphic image based on the detected line drawing. The processor 220 may analyze the determined graphic image and may separate the image into a two-dimensional (2D) graphic image having a transparent background. For example, the processor 220 may generate the graphic image as a portable network graphics (PNG) file to make the background of the graphic image transparent. The processor 220 may apply the 2D graphic image having the transparent background to the left arm of the 3D avatar and may display the 3D avatar.

When personalization item generation is selected while the 3D avatar is being displayed, the processor 220 may obtain an image including the body part using the camera 210, may apply the 2D graphic image corresponding to the line drawing drawn on the body part to a portion of the 3D avatar corresponding to the body part, and may display the 3D avatar. The processor 220 may store the 2D graphic image as a personalization item of the 3D avatar.

The processor 220 may detect and display at least one recommended graphic image related to the 2D graphic image in the memory 230 or the server 108. The processor 220 may apply the recommended graphic image selected by the user to the portion of the 3D avatar corresponding to the body part and may display the 3D avatar.

The processor 220 may provide an edit menu for editing the 2D graphic image.

The processor 220 may provide the edit menu for editing the 2D graphic image in the state in which the 2D graphic image is applied to the 3D avatar. The processor 220 may provide the edit menu to edit the size of the 2D graphic image applied to the 3D avatar or to perform an edit for curving or rotating the 2D graphic image.

The processor 220 may obtain an image including an object using the camera 210, may detect a graphic image included in the object, may apply the detected graphic image to a 3D graphic object selected by the user, and may display the 3D graphic object. For example, the processor 220 may capture an image including a bag worn by the user using the camera and may detect a 2D graphic image corresponding to a logo (e.g., “SMILE”) drawn on the bag. When a 3D graphic object corresponding to the bag is selected by the user from among 3D graphic objects corresponding to the bag provided by the memory 230 or the server 108, the processor 220 may apply the 2D graphic image (e.g., “SMILE”) to the selected 3D graphic object and may display the 3D graphic object.

The processor 220 may obtain an image including the whole body of the user using the camera 210, may apply a plurality of 3D graphic objects corresponding to a plurality of objects obtained from the image to the 3D avatar representing the user, and may display the 3D avatar. For example, the processor 220 may apply a graphic item corresponding to an item (e.g., clothes or an accessory) worn by the user to the 3D avatar representing the user and may display the 3D avatar so as to appear identical to an image obtained by photographing the current appearance of the user or an image of the user stored in the memory.

The processor 220 may obtain an image including the whole body of the user using the camera 210. Here, the user may photograph the user reflected in a mirror using the camera 210. The processor 220 may obtain an image including the whole body of the user from images selected by the user from among a plurality of images stored in the memory 230.

The processor 220 may recognize a face in the image using a face recognition algorithm and may identify a 3D avatar corresponding to the face.

The processor 220 may identify a plurality of objects in the image including the whole body and position information about each of the plurality of objects using an object analysis program and may display the plurality of objects in an area such that the plurality of objects can be selected. The processor 220 may identify, from the memory 230 or the server 108, at least one 3D graphic object corresponding to at least one object selected by the user from among the plurality of objects, based on category information and attribute information about the at least one object.

The processor 220 may apply the at least one 3D graphic object to the 3D avatar corresponding to the face and may display the 3D avatar.

The processor 220 may store the at least one 3D graphic object as a personalization item of the 3D avatar.

The processor 220 may analyze context information, may determine, as a recommended item, a 3D graphic object related to the context information among personalization items of the 3D avatar representing the user, may apply the 3D graphic object to the 3D avatar, and may display the 3D avatar.

The context information is information that can be identified in connection with a plurality of applications installed in the electronic device and may include, for example, weather information that can be identified in connection with a weather application and schedule information that can be identified in connection with a schedule application.

When an avatar recommendation according to the weather information is selected by the user, the processor 220 may identify the weather for the current day in connection with the weather application. The processor 220 may change and display a background screen displaying the 3D avatar representing the user, based on information about the weather identified for the current day. The processor 220 may identify a 3D graphic object corresponding to an item recommendable based on the weather information among the personalization items of the 3D avatar, may apply the identified 3D graphic object to the 3D avatar, and may display the 3D avatar. The processor 220 may identify the user's purchase history in connection with a payment application installed in the electronic device 201, and when an item recommendable based on the weather information is identified in the purchase history of the user, the processor 220 may apply a 3D graphic object corresponding to the identified item to the 3D avatar and may display the 3D avatar, or may display the 3D graphic object as a recommended item. When there is no recommended item according to the weather information among the personalization items of the 3D avatar or in the purchase history of the user, the processor 220 may apply an item according to the weather information among basic items stored in the electronic device 201 to the 3D avatar and may display the 3D avatar, or may display the item as a recommended item. For example, when the weather for the current day is identified as rain in connection with the weather application, the processor 220 may apply a 3D graphic object corresponding to a raincoat or an umbrella among the personalization items of the 3D avatar representing the user to the 3D avatar on a rainy background screen and may display the 3D avatar. Accordingly, the processor 220 may apply a raincoat or umbrella graphic object corresponding to a raincoat or umbrella actually possessed by the user to the 3D avatar according to the weather information for the current day and may display the 3D avatar, thereby recommending an item corresponding to the weather information for the current day.

When an avatar recommendation according to the schedule information is selected by the user, the processor 220 may identify a schedule for the current day in connection with the schedule application. The processor 220 may identify a 3D graphic object corresponding to an item recommendable based on the schedule information among the personalization items of the 3D avatar representing the user, may apply the identified 3D graphic object to the 3D avatar, and may display the 3D avatar. The processor 220 may identify the user's purchase history in connection with the payment application installed in the electronic device 201, and when an item recommendable based on the schedule information is identified in the purchase history of the user, the processor 220 may apply a 3D graphic object corresponding to the identified item to the 3D avatar and may display the 3D avatar, or may display the 3D graphic object as a recommended item. When there is no recommended item according to the schedule information among the personalization items of the 3D avatar or in the purchase history of the user, the processor 220 may apply an item according to the schedule information among basic items stored in the electronic device 201 to the 3D avatar and may display the 3D avatar, or may display the item as a recommended item. For example, when schedule information for the current day is identified as "Going to ski" in connection with the schedule application, the processor 220 may apply a 3D graphic object corresponding to skiwear among the personalization items of the 3D avatar representing the user to the 3D avatar and may display the 3D avatar. Accordingly, the processor 220 may apply a skiwear graphic object corresponding to skiwear actually possessed by the user to the 3D avatar according to the schedule information of the user and may display the 3D avatar, thereby recommending an item corresponding to the schedule information.

When an avatar recommendation according to the schedule information and the weather information is selected by the user, the processor 220 may identify the schedule for current day and the weather for the current day in connection with the schedule application and the weather application. The processor 220 may identify a 3D graphic object corresponding to an item recommendable based on the schedule information and the weather information among the personalization items of the 3D avatar representing the user, may apply the identified 3D graphic object to the 3D avatar, and may display the 3D avatar. For example, when the weather for the current day is identified as rain in connection with the weather application and schedule information for the current day is identified as "Going to ski" in connection with the schedule application, the processor 220 may apply a 3D graphic object corresponding to a skiwear among the personalization items of the 3D avatar representing the user to the 3D avatar on a rainy background screen and may display the 3D avatar.

The processor 220 may recognize a face using the face recognition algorithm, may detect age information, gender information, and race information based on the recognized face or information input by the user, and may determine a face of the 3D avatar satisfying conditions of the detected age information, gender information, and race information in a face DB stored in the memory 230 or the server 108.

The memory 230 may store data of the electronic device 201. For example, the memory 230 may be configured to be substantially the same as or similar to the memory 130 described with reference to FIG. 1. For example, the memory 230 may be configured as a nonvolatile memory.

The memory 230 may store various 2D graphic images and 3D graphic objects applicable to a 3D avatar.

The memory 230 may store a face recognition algorithm for recognizing a face and an object analysis algorithm for recognizing an object in a captured or stored image.

The memory 230 may store a 2D graphic image and personalization items corresponding to a 3D graphic object according to each type of 3D avatar.

The memory 230 may store a plurality of category DBs, classified by category, and may store a plurality of 3D graphic objects having different pieces of attribute information in each of the plurality of category DBs.

The display 260 may display an avatar under the control of the processor 220. The display 260 may be configured to be substantially the same as or similar to the display device 160 described with reference to FIG. 1.

The communication module 280 may receive data about an avatar from the server 108 or an external electronic device. The communication module 280 may transmit data about an avatar stored in the memory 230 to the server 108 or the external electronic device.

An electronic device may include a camera 210, a display 260, and a processor, wherein the processor may be configured to obtain an image using the camera; determine a 3D graphic object corresponding to an object included in the obtained image; and apply the determined 3D graphic object to a 3D avatar to display the 3D avatar.

The processor may be configured to edit the 3D graphic object in the state in which the 3D graphic object is applied to the 3D avatar.

The processor may be configured to store the 3D graphic object as a personalization item of the 3D avatar.

The processor may be configured to obtain the image using the camera when personalization item generation is selected in the state in which the 3D avatar is displayed.

The processor may be configured to detect a 2D graphic image from an image comprising a body part when obtaining the image using the camera; and apply the 2D graphic image to a portion of the 3D avatar corresponding to the body part to display the 3D avatar.

The processor may be configured to display at least one recommended graphic image related to the 2D graphic image; and apply a recommended graphic image selected by a user to the portion of the 3D avatar corresponding to the body part to display the 3D avatar.

The processor may be configured to recognize a face from an image including a whole body when obtaining the image using the camera; determine a 3D avatar corresponding to the recognized face; determine a plurality of objects in the image and position information about each of the plurality of objects; determine a plurality of 3D graphic objects corresponding to the plurality of objects; and apply the plurality of 3D graphic objects to a position of the 3D avatar corresponding to the position information about each of the plurality of objects to display the 3D avatar.

The processor may be configured to store the plurality of 3D graphic objects as personalization items of the 3D avatar.

The processor may be configured to analyze context information; determine, as a recommended item, a 3D graphic object related to the context information among personalization items of the 3D avatar; and display the 3D graphic object determined as the recommended item.

The processor may be configured to apply the 3D graphic object, determined as the recommended item, to the 3D avatar to display the 3D avatar.

Figure 3:
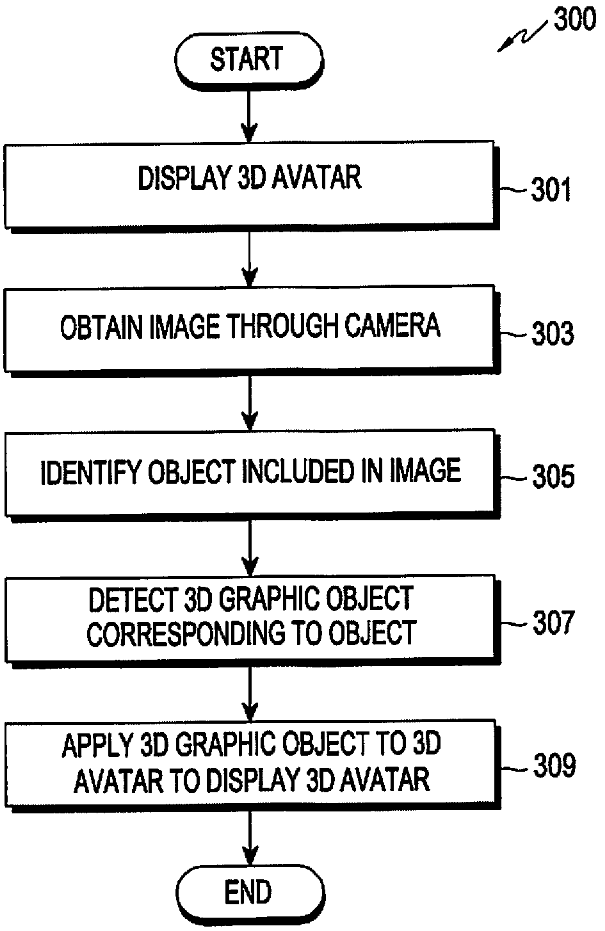
FIG. 3 is a flowchart illustrating an operation of an electronic device controlling a graphic object, according to an embodiment.

FIG. 3 is a flowchart 300 illustrating an operation of an electronic device controlling a graphic object, according to an embodiment. A graphic object control method may include step 301 to step 309. The graphic object control method may be performed by at least one of an electronic device and at least one processor of the electronic device.

In step 301, the processor displays a 3D avatar representing a user of the electronic device on a display 260.

In step 303, the processor obtains an image using a camera 210. When the user selects personalization item generation while the 3D avatar is being displayed on the display 260, the processor may activate the camera to capture an image.

In step 305, the processor analyzes and identifies, using an object analysis algorithm, an object included in the image obtained using the camera.

In step 307, the processor detects a 3D graphic object corresponding to the identified object from a memory 230 or a server 108. The processor may determine a category DB corresponding to category information about the identified object among a plurality of category DBs stored in the memory 230 or the server 108. The processor may detect a 3D graphic object corresponding to attribute information the identified object among a plurality of 3D graphic objects stored in the determined category DB.

In step 309, the processor applies the detected 3D graphic object to the 3D avatar to display the 3D avatar. The processor may store the detected 3D graphic object as a personalization item of the 3D avatar in the memory 230.

FIGS. 4A-4D illustrate an operation of an electronic device controlling a graphic object, according to an embodiment. The graphic object control operation may be performed by at least one of an electronic device and at least one processor of the electronic device.

Figure 4A:
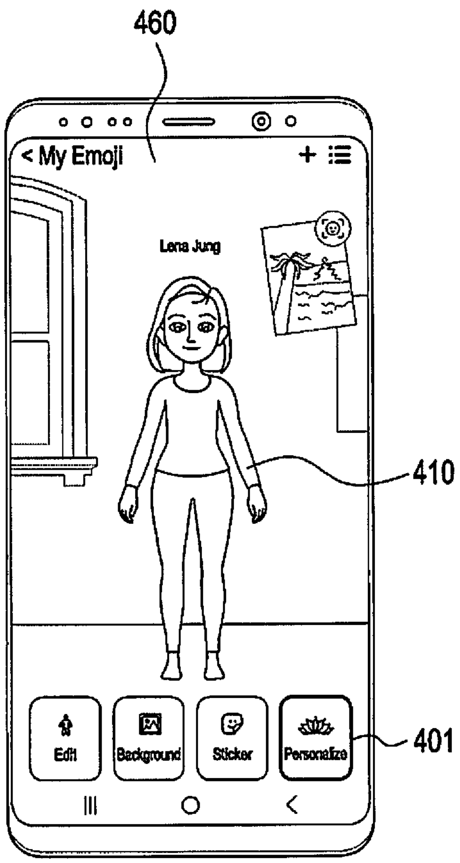
FIGS. 4A-4D illustrate an operation of an electronic device controlling a graphic object, according to an embodiment.

As illustrated in FIG. 4A, the processor may display a 3D avatar 410 representing a user of the electronic device on a display 460. When receiving an input through a personalization generation button 401 by the user while the 3D avatar 410 is being displayed on the display 460, the processor may activate a camera 210.

Figure 4B:
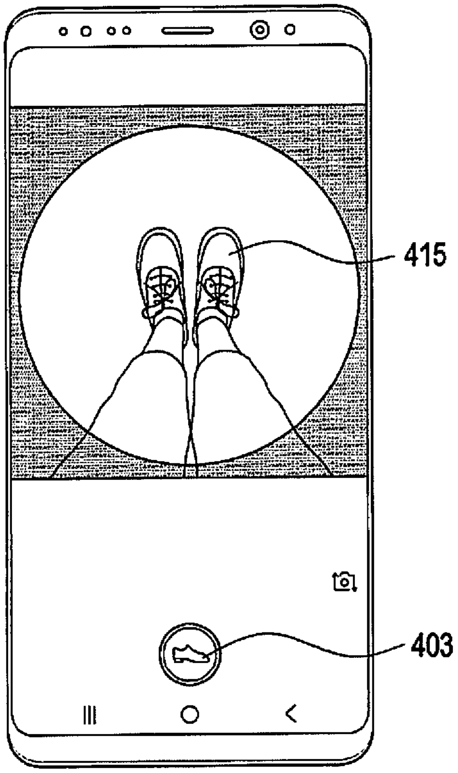

As illustrated in FIG. 4B, the processor may obtain an image including an object (e.g., shoes 415) using the camera 210. The processor may identify the type of the object included in the image using an object analysis algorithm while receiving the image using the camera, and may display an icon 403 indicating the type of the object.

Figure 4C:
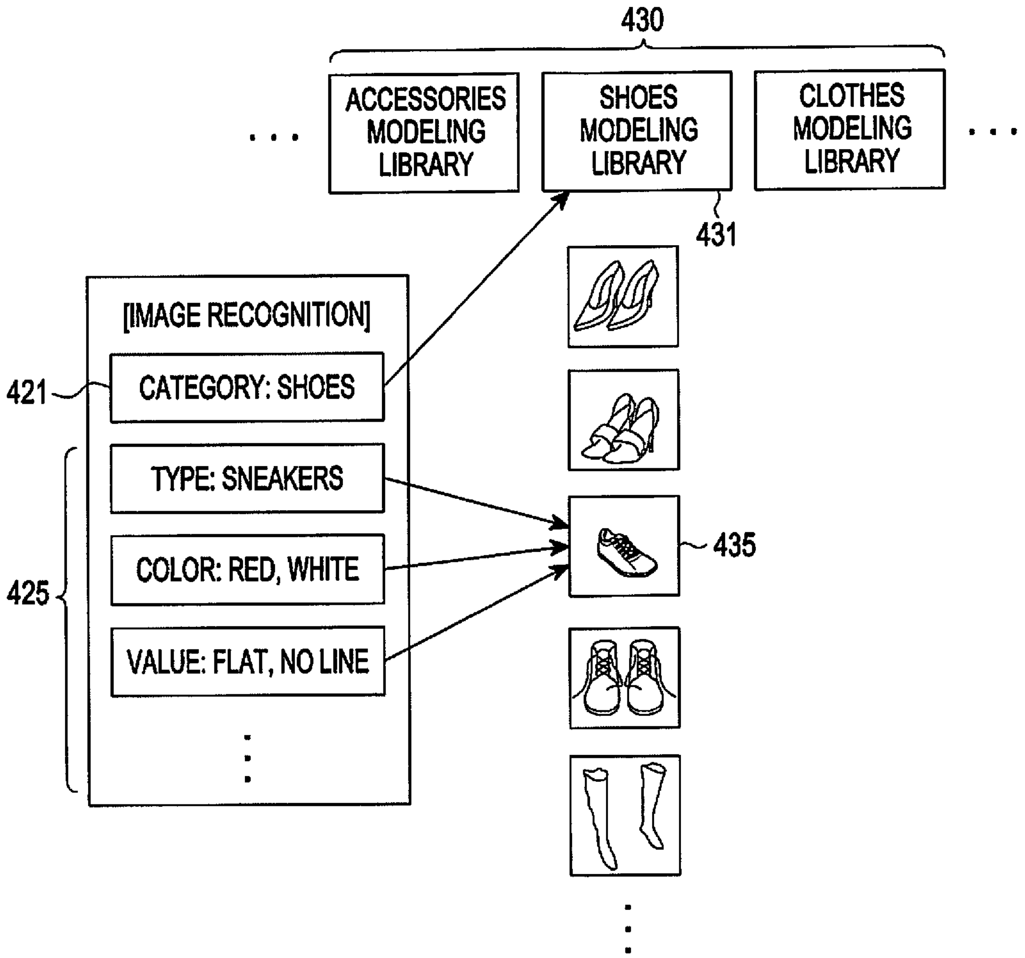

As illustrated in FIG. 4C, the processor may analyze the object included in the image using the object analysis algorithm and may detect category information 421 and attribute information 425 about the object, thereby identifying a shoe object included in the image. The processor may detect a shoe category DB 431 corresponding to the category information about the shoe object among a plurality of category DBs 430 stored in a memory 230 or a server 108. The processor may detect a 3D graphic object 435 corresponding to the attribute information 425 about the shoe object among a plurality of 3D graphic objects stored in the shoe category DB 431.

Figure 4D:
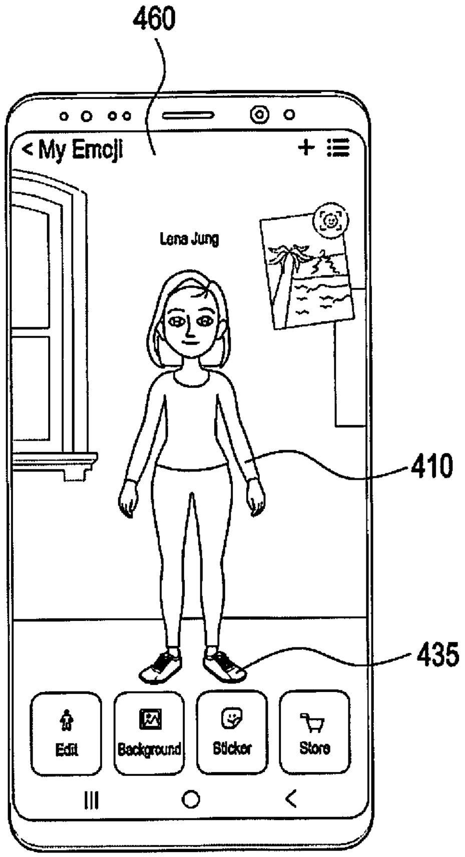

As illustrated in FIG. 4D, the processor may apply the detected 3D graphic object 435 to the feet of the 3D avatar 410 based on the category information 421 (e.g., shoes) and the attribute information 425 (e.g., sneakers) about the detected 3D graphic object 435 and may display the 3D avatar on the display 460. The processor may store the 3D graphic object 435 as a personalization item of the 3D avatar 410.

FIGS. 5A-5D illustrate an operation of an electronic device controlling a graphic object, according to an embodiment. The graphic object control operation may be performed by at least one of an electronic device and at least one processor of the electronic device.

Figure 5A:
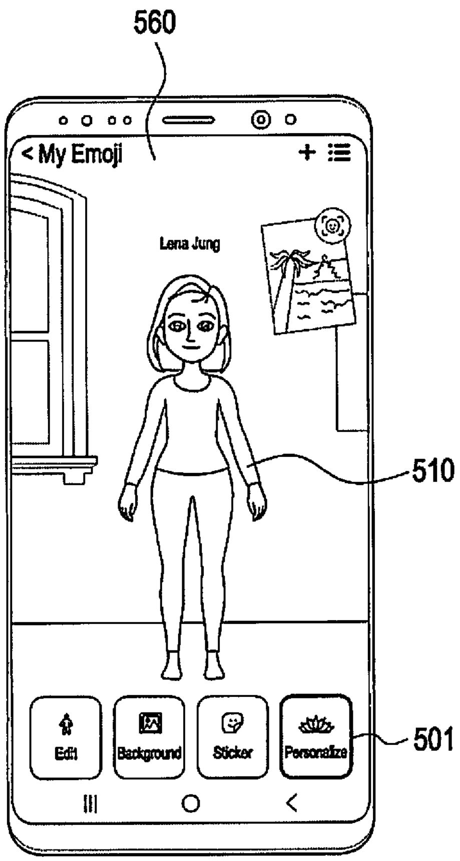
FIGS. 5A-5D illustrate an operation of an electronic device controlling a graphic object, according to an embodiment.

As illustrated in FIG. 5A, the processor may display a 3D avatar 510 representing a user of the electronic device on a display 560. When receiving an input through a personalization generation button 501 by the user while the 3D avatar 510 is being displayed on the display 560, the processor may activate a camera 210.

Figure 5B:
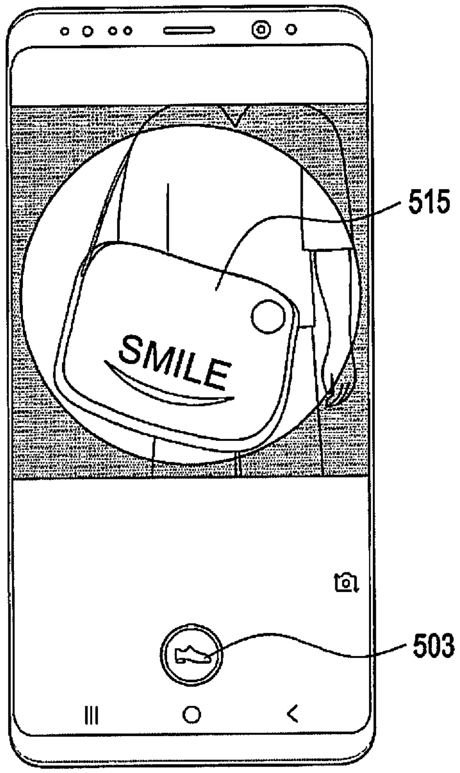

As illustrated in FIG. 5B, the processor may obtain an image including an object (e.g., a bag 515) using the camera 210. The processor may identify the type of the object included in the image using an object analysis algorithm while receiving the image using the camera, and may display an icon 503 indicating the type of the object.

Figure 5C:
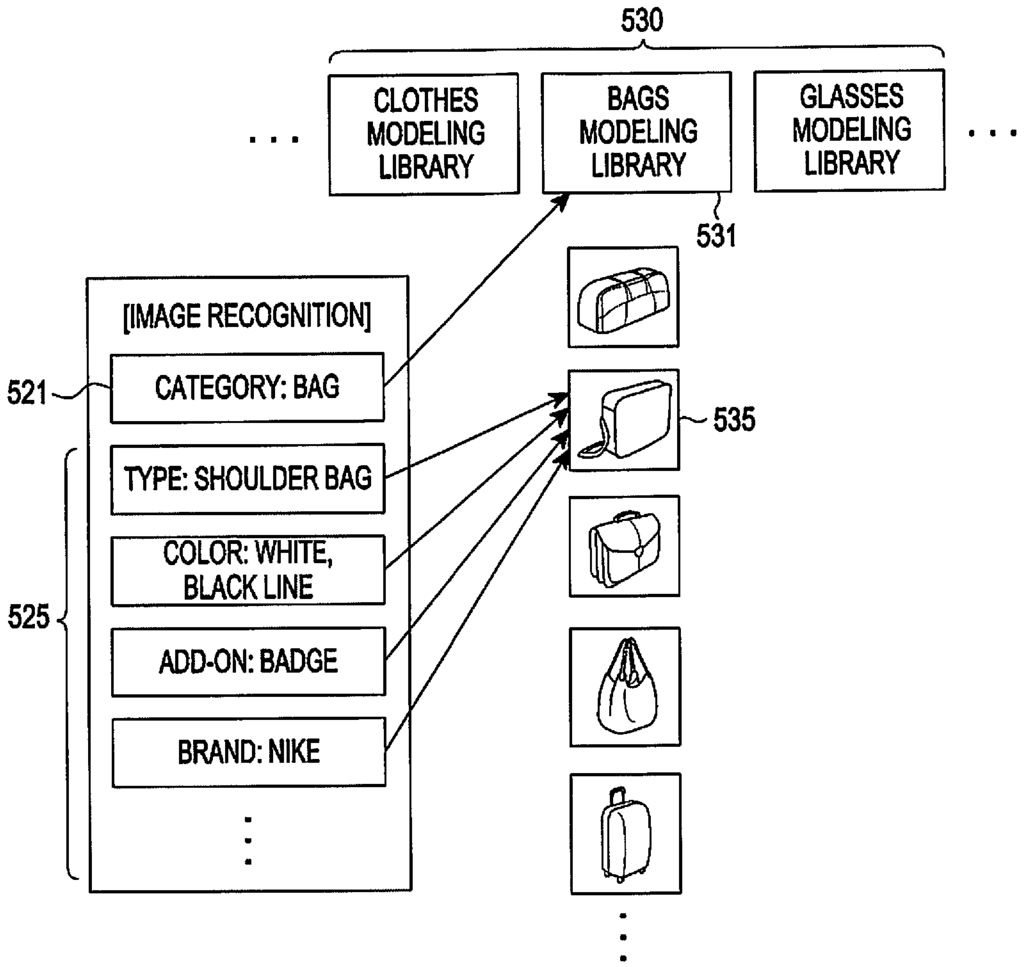

As illustrated in FIG. 5C, the processor may analyze the object included in the image using the object analysis algorithm and may detect category information 521 and attribute information 525 about the object, thereby identifying a bag object included in the image. The processor may detect a bag category DB 531 corresponding to the category information about the bag object among a plurality of category DBs 530 stored in a memory 230 or a server 108. The processor may detect a 3D graphic object 535 corresponding to the attribute information 525 about the bag object among a plurality of 3D graphic objects stored in the bag category DB 531.

Figure 5D:
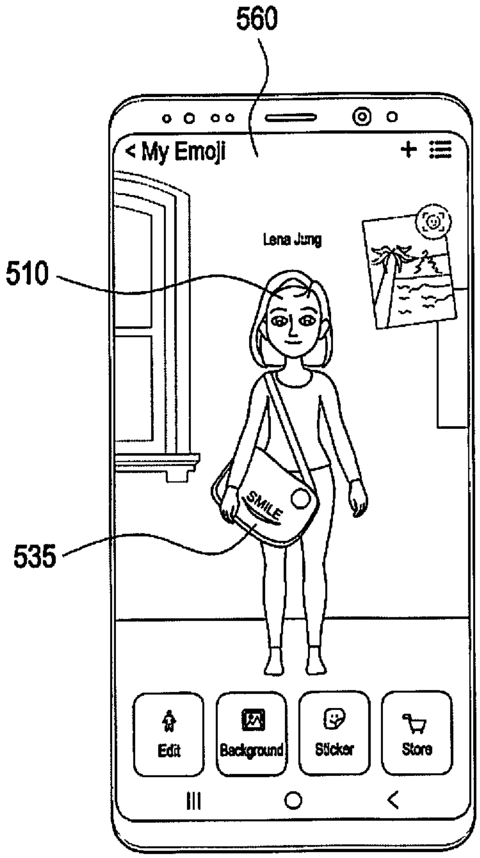

As illustrated in FIG. 5D, the processor may apply the detected 3D graphic object 535 to the shoulder of the 3D avatar 510 based on the category information 521 (e.g., a bag) and the attribute information 525 (e.g., a shoulder bag) about the detected 3D graphic object 535 and may display the 3D avatar on the display 560. The processor may store the 3D graphic object 535 as a personalization item of the 3D avatar 510.

Figure 6:
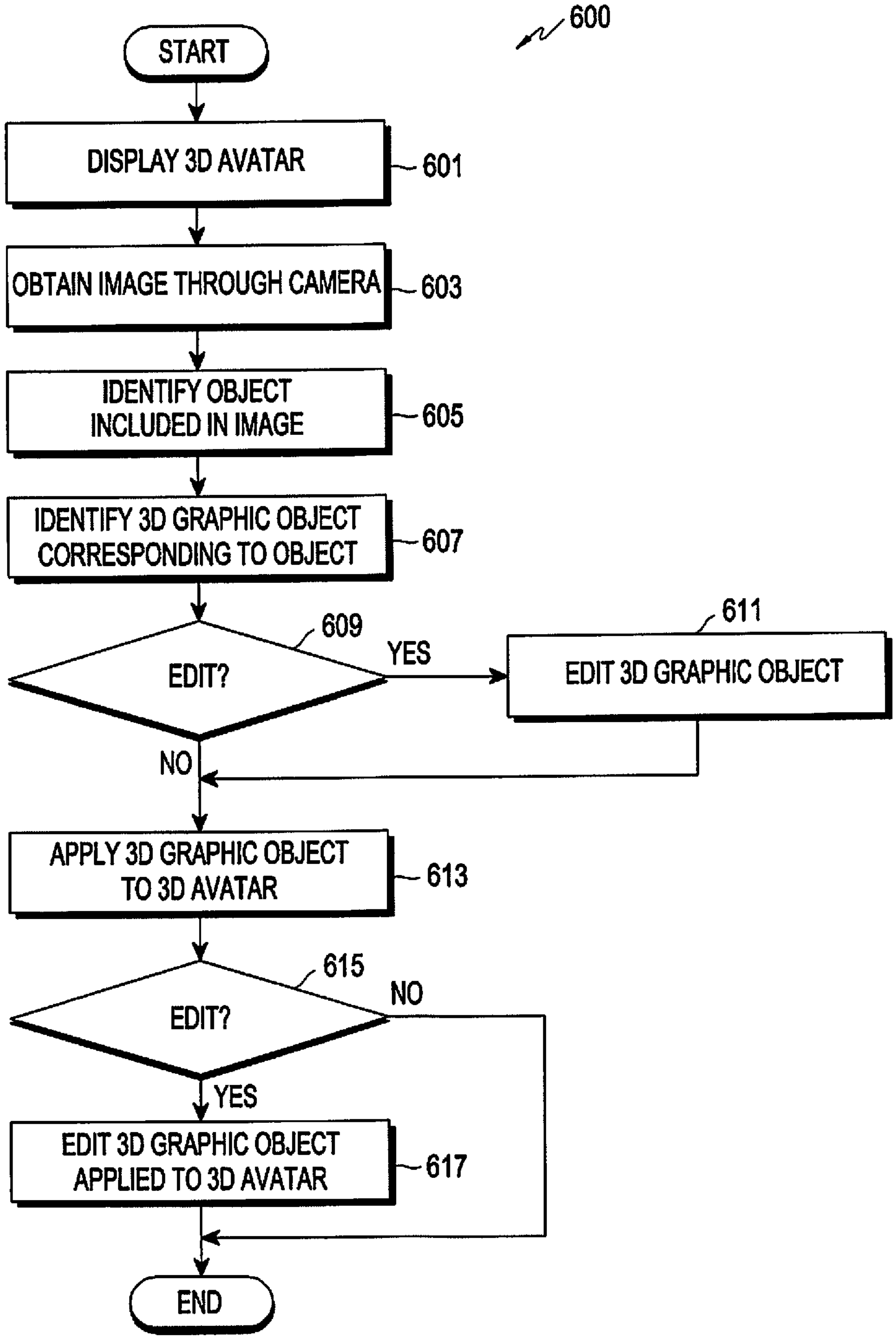
FIG. 6 is a flowchart illustrating an operation of an electronic device controlling a graphic object, according to an embodiment.

FIG. 6 is a flowchart 600 illustrating an operation of an electronic device controlling a graphic object, according to art embodiment. A graphic object control method may include step 601 to step 617. The graphic object control method may be performed by at least one of an electronic device and at least one processor of the electronic device.

In step 601, the processor displays a 3D avatar representing a user of the electronic device on a display 260.

In step 603, the processor obtains an image using a camera 210. When the user selects personalization item generation while the 3D avatar is being displayed on the display 260, the processor may activate the camera to capture an image.

In step 605, the processor analyzes and identifies, using an object analysis algorithm, an object included in the image obtained using the camera.

In step 607, the processor detects a 3D graphic object corresponding to the identified object from a memory 230 or a server 108. The processor may determine a category DB corresponding to category information about the identified object among a plurality of category DBs stored in the memory 230 or the server 108. The processor may detect a 3D graphic object corresponding to attribute information on the identified object among a plurality of 3D graphic objects stored in the determined category DB.

When editing is selected while the 3D graphic object is being displayed on the display 260 in step 609, the processor displays an edit menu for editing the 3D graphic object and displays the 3D graphic object edited by the user in step 611.

When editing is not selected while the 3D graphic object is being displayed on the display 260 in step 609, the processor applies the detected 3D graphic object to the 3D avatar and displays the 3D avatar in step 613.

When editing is selected while the 3D avatar with the 3D graphic object applied thereto is being displayed on the display 260 in step 615, the processor displays an edit menu for editing the 3D graphic object applied to the 3D avatar and displays the 3D graphic object edited by the user in step 617.

When editing is not selected while the 3D avatar with the 3D graphic object applied thereto is being displayed on the display 260 in step 615, the processor performs a different function on the 3D graphic object applied to the 3D avatar.

FIGS. 7A-7F illustrate an operation of an electronic device controlling a graphic object, according to an embodiment. The graphic object control operation may be performed by at least one of an electronic device and at least one processor of the electronic device.

Figure 7A:
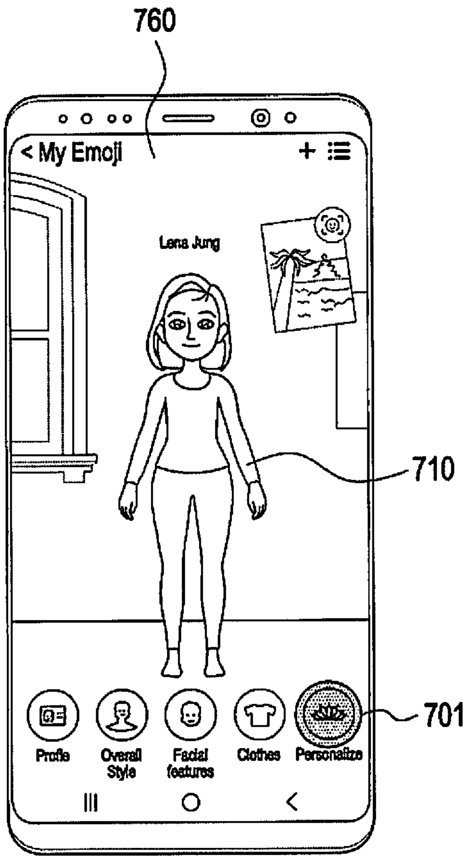
FIGS. 7A-7F illustrate an operation of an electronic device controlling a graphic object, according to an embodiment.

As illustrated in FIG. 7A, the processor may display a 3D avatar 710 representing a user of the electronic device on a display 760. When receiving an input through a personalization generation button 701 by the user while the 3D avatar 710 is being displayed on the display 760, the processor may activate a camera 210.

Figure 7B:
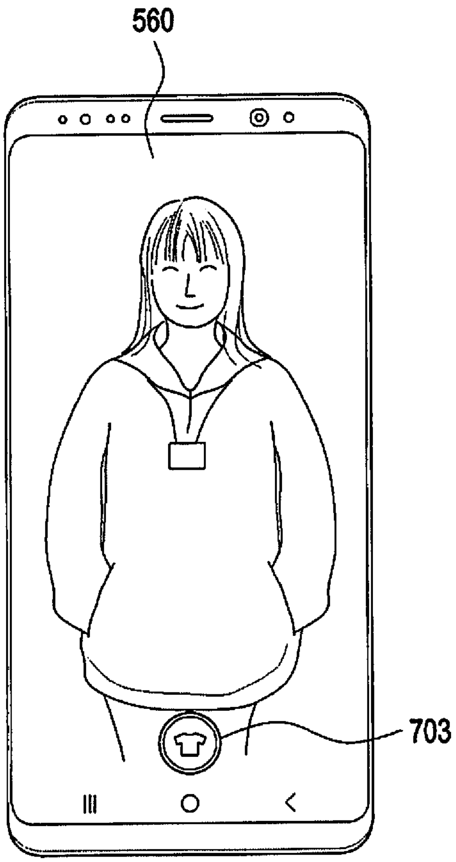

As illustrated in FIG. 7B, the processor may identify the type of an object included in an image using an object analysis algorithm while receiving the image using the camera 210, and may display an icon 703 indicating the type of the object.

Figure 7C:
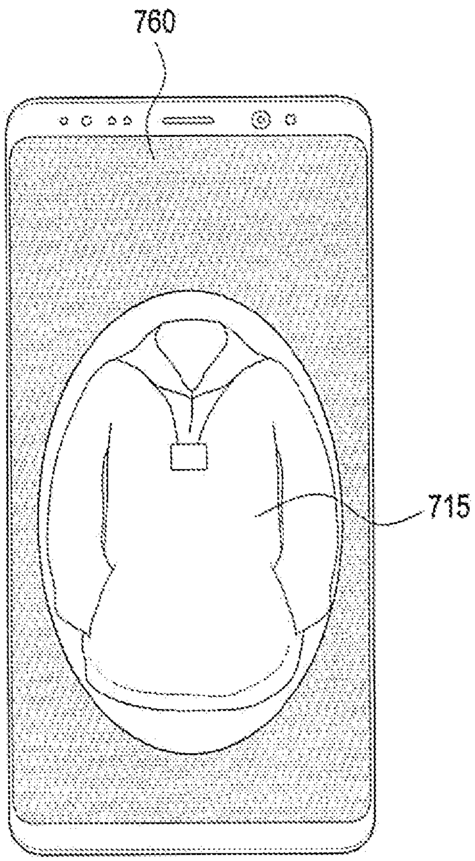

As illustrated in FIG. 7C, the processor may obtain an image including an object (e.g., a cloth 715) using the camera 210. The processor may analyze the object included in the image using the object analysis algorithm and may detect category information (e.g., clothing) and attribute information (e.g., hooded T-shirt) about the object, thereby identifying a clothing object included in the image. The processor may detect a clothing category DB corresponding to the category information about the clothing object among a plurality of category DBs 530 stored in a memory 230 or a server 108. The processor may detect a 3D graphic object 735 corresponding to the attribute information (e.g., hooded T-shirt) about the clothing object among a plurality of 3D graphic objects stored in the clothing category DB.

Figure 7D:
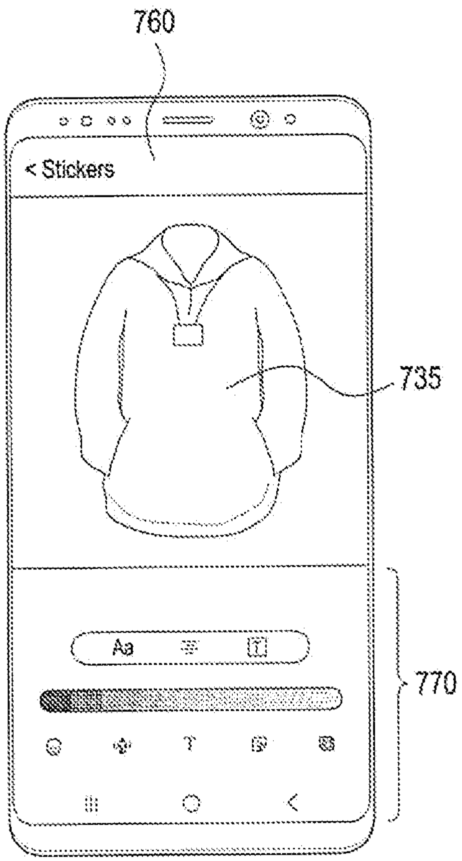

As illustrated in FIG. 7D, the processor may provide an edit menu 770 for editing the 3D graphic object 735. The user may edit the 3D graphic object 735 to be more similar to the clothing object included in the image using the edit menu.

Figure 7E:
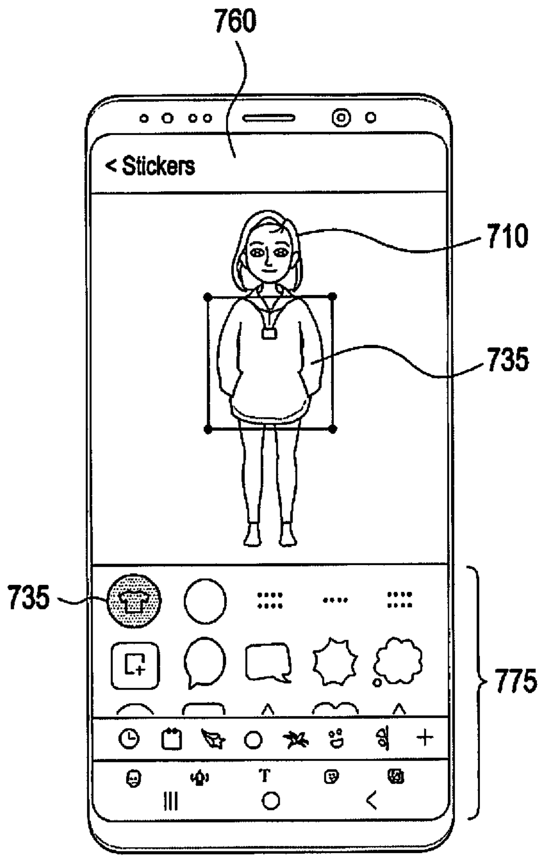

As illustrated in FIG. 7E, the processor may apply the detected 3D graphic object 735 to a top of the 3D avatar 710 based on the category information (e.g., clothing) and the attribute information (e.g., hooded T-shirt and white/black) about the detected 3D graphic object 735 and may display the 3D avatar on the display 760. The processor may provide an edit menu 775 for editing the 3D graphic object 735 applied to the top of the 3D avatar 710. The user may adjust the size and position of the 3D graphic object 735 applied to the top of the 3D avatar 710 or may insert text or a logo to the 3D graphic object 735 using the edit menu.

Figure 7F:
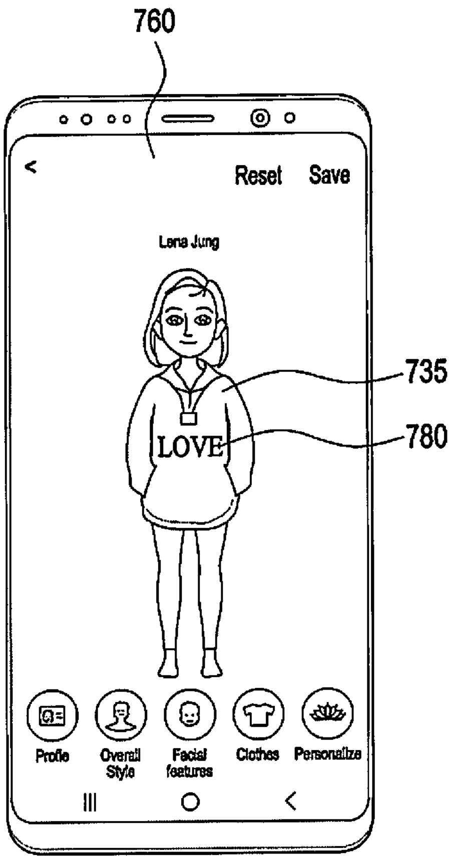

As illustrated in FIG. 7F, when an edit is completed, the processor may display the 3D graphic object 735, into which new text 780 is inserted, on the top of the 3D avatar 710 on the display 760. The processor may store the 3D graphic object 735 into which the new text 780 is inserted as a personalization item of the 3D avatar 710.

Figure 8:
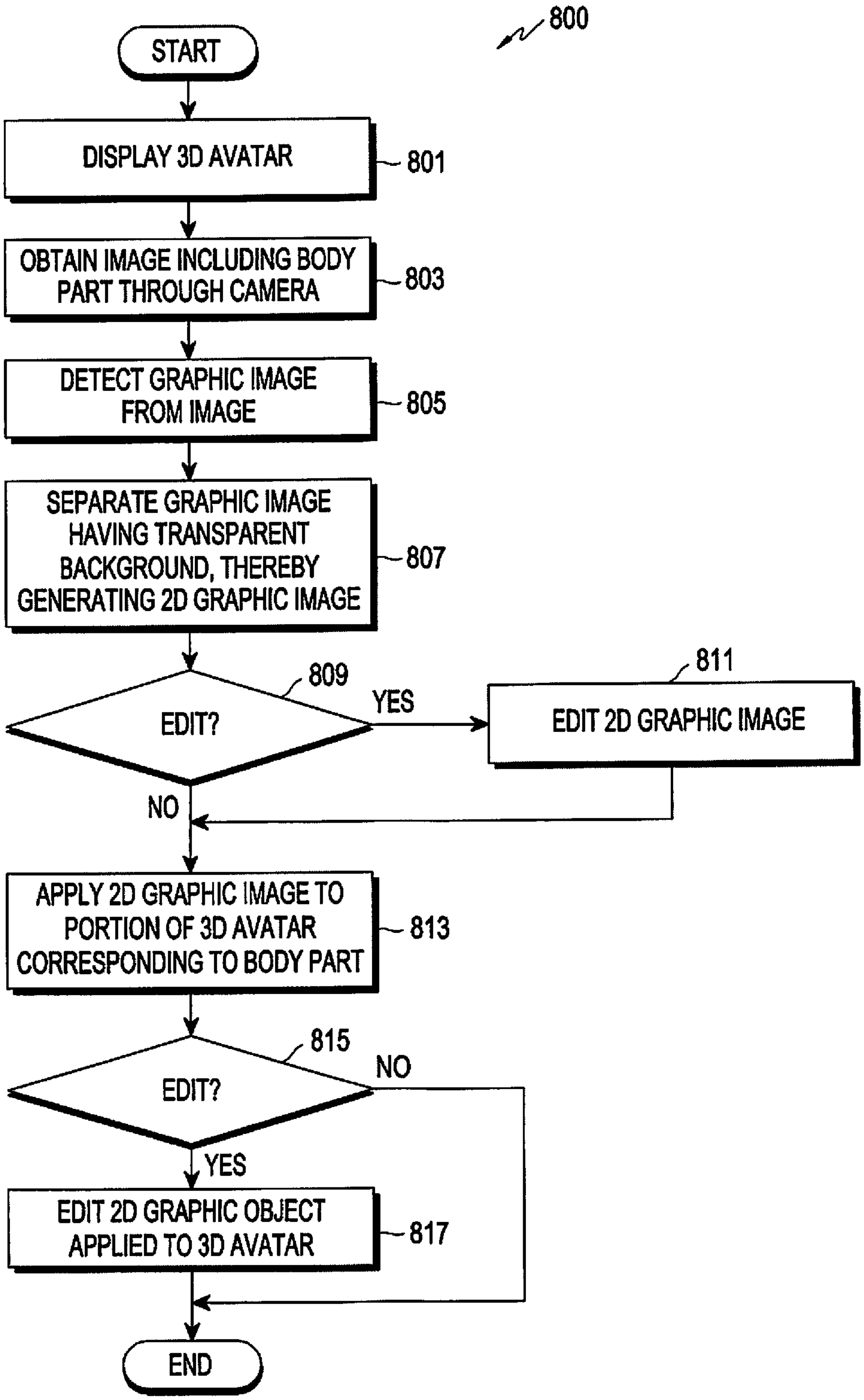
FIG. 8 is a flowchart illustrating an operation of an electronic device controlling a graphic object, according to an embodiment.

FIG. 8 is a flowchart 800 illustrating an operation of an electronic device controlling a graphic object, according to an embodiment. A graphic object control method may include step 801 to step 817. The graphic object control method may be performed by at least one of an electronic device and at least one processor of the electronic device.

In step 801, the processor displays a 3D avatar representing a user of the electronic device on a display 260.

In step 803, the processor obtains an image including a body part using a camera 210. When the user selects personalization item generation while the 3D avatar is being displayed on the display 260, the processor may activate the camera to capture an image.

In step 805, the processor detects, using an object analysis algorithm, a graphic image drawn on the body part from the image obtained using the camera. The processor may detect the distribution of skin color and the curvature of a line from the image using an object analysis algorithm, and may determine that the body part is the left arm based on the detected distribution of the skin color and the detected curvature of the line. The processor 220 may analyze a tattoo drawn on the left arm of the body using the object analysis algorithm to detect the line drawing of the tattoo and may determine a graphic image based on the detected line drawing.

In step 807, the processor analyzes the determined graphic image and separates an image having a transparent background, thereby generating a 2D graphic image. The processor may generate the 2D graphic image as a PNG file to make the background of the 2D graphic image transparent.

When editing is selected while the 2D graphic image is being displayed on the display 260 in step 809, the processor displays an edit menu for editing the 2D graphic image and may display the 2D graphic image edited by the user in step 811.

When editing is not selected while the 2D graphic image is being displayed on the display 260 in step 809, the processor applies the 2D graphic image to a portion of the 3D avatar corresponding to the body part and displays the 3D avatar in step 813. The processor may apply the 2D graphic image having the transparent background to the left arm of the 3D avatar and may display the 3D avatar.

When editing is selected while the 3D avatar with the 2D graphic image applied thereto is being displayed on the display 260 in step 815, the processor displays an edit menu for editing the 2D graphic image applied to the 3D avatar and displays the 2D graphic image edited by the user in step 817.

When editing is not selected while the 3D avatar with the 2D graphic image applied thereto is being displayed on the display 260 in step 815, the processor performs a different function on the 2D graphic image applied to the 3D avatar.

FIGS. 9A-9F illustrate an operation of an electronic device controlling a graphic object, according to an embodiment. The graphic object control operation may be performed by at least one of an electronic device and at least one processor of the electronic device.

Figure 9A:
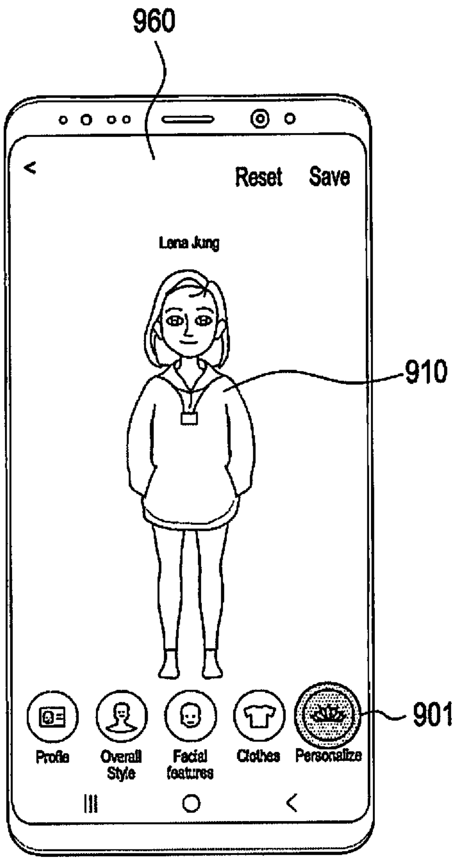
FIGS. 9A-9F illustrate an operation of an electronic device controlling a graphic object, according to an embodiment.

As illustrated in FIG. 9A, the processor may display a 3D avatar 910 representing a user of the electronic device on a display 960. When receiving an input through a personalization generation button 901 by the user while the 3D avatar 910 is being displayed on the display 960, the processor may activate a camera 210.

Figure 9B:
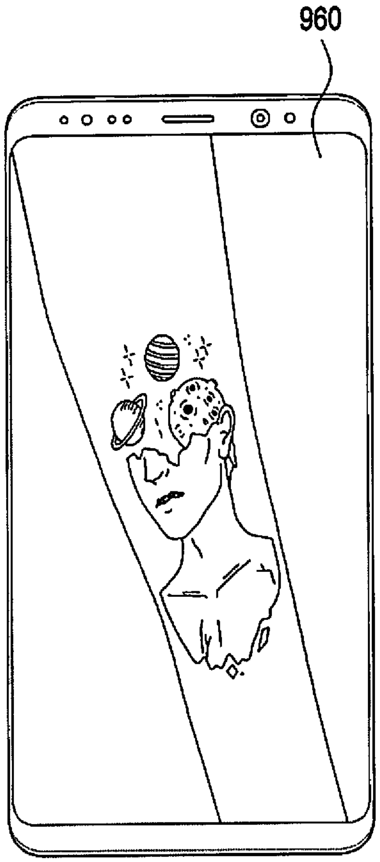

As illustrated in FIG. 9B, the processor may obtain an image including a body part using the camera 210.

Figure 9C:
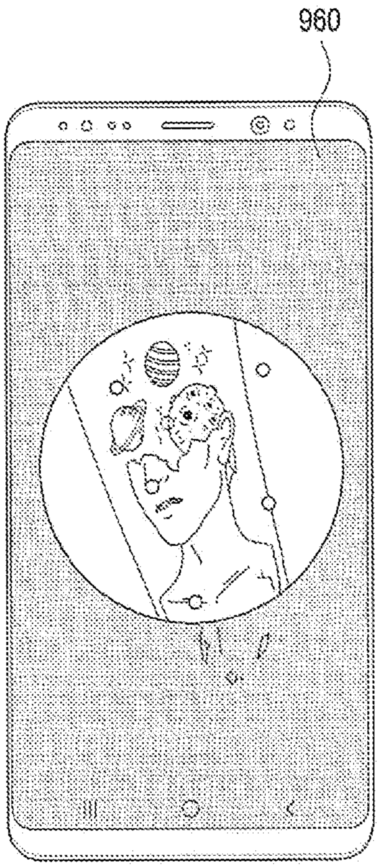

As illustrated in FIG. 9C, the processor may detect the distribution of skin color and the curvature of a line from the image using an object analysis algorithm, and may determine that the body part is the left arm based on the detected distribution of the skin color and the detected curvature of the line. The processor may analyze a tattoo drawn on the left arm of the body using the object analysis algorithm to detect the line drawing of the tattoo and may determine a graphic image based on the detected line drawing. The processor may determine a graphic image included in an area selected by the user in the image. The processor may analyze the determined graphic image and may separate an image having a transparent background, thereby generating a 2D graphic image. For example, the processor may generate the 2D graphic image as a PNG file to make the background of the 2D graphic image transparent.

Figure 9D:
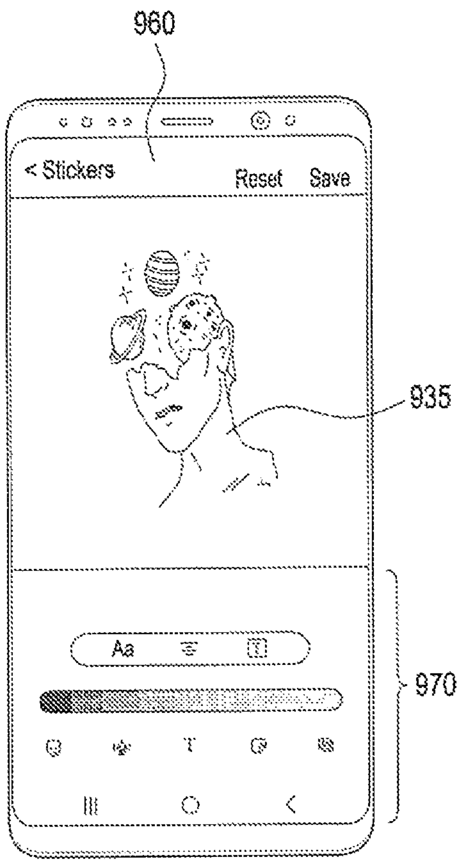

As illustrated in FIG. 9D, the processor may provide an edit menu 970 for editing the 2D graphic image 935. The user may edit the 2D graphic image 935 to be more similar to the drawn tattoo in the image using the edit menu.

Figure 9E:
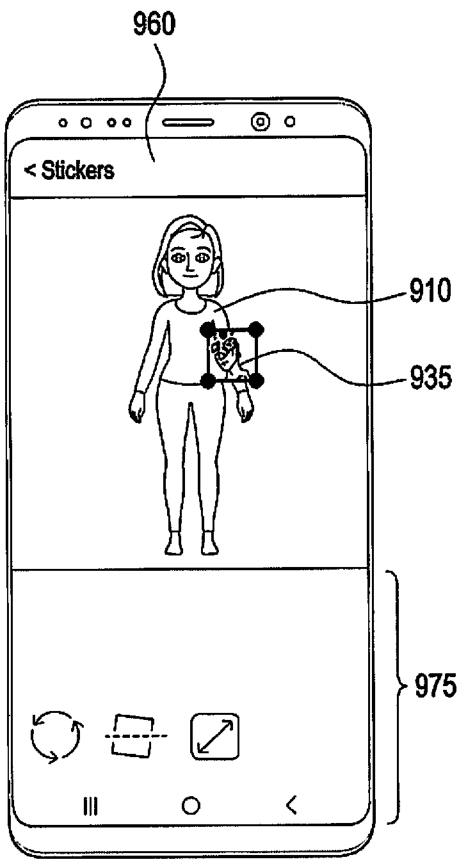

As illustrated in FIG. 9E, the processor may apply the 2D graphic image having the transparent background to the left arm of the 3D avatar and may display the 3D avatar. The processor may provide an edit menu 975 for editing the 2D graphic image 935 applied to the left art of the 3D avatar 910. The user may edit the curvature degree or rotations of the 2D graphic image 935 applied to a top of the 3D avatar 910 using the edit menu to apply the 2D graphic image 935 according to the curvature of the arm of the 3D avatar 910 and may display the 3D avatar. When the 3D avatar 910 is currently wearing a 3D graphic object corresponding to a long-sleeved top, the processor may display a pop-up window to ask whether to change to a 3D graphic object corresponding to a top that exposes the arm.

Figure 9F:
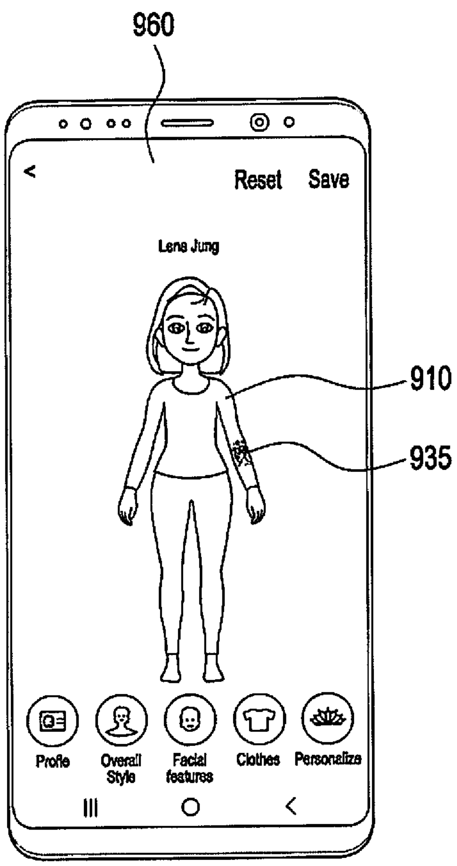

As illustrated in FIG. 9F, when an edit is completed, the processor may apply the 2D graphic image 935 to the left arm of the 3D avatar 910 and may display the 3D avatar 910 on the display 960. The processor may store the 2D graphic object 935 as a personalization item of the 3D avatar 910.

FIGS. 10A-10D illustrate an operation of an electronic device controlling a graphic object, according to an embodiment. The graphic object control operation may be performed by at least one of an electronic device and at least one processor of the electronic device.

Figure 10A:
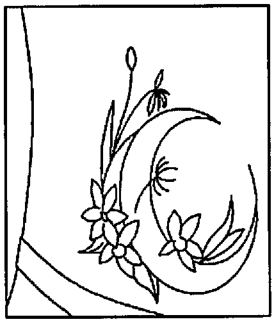
FIGS. 10A-10D illustrate an operation of an electronic device controlling a graphic object, according to an embodiment.

As illustrated in FIG. 10A, the processor may identify a graphic image 1015 in an image using an object analysis algorithm and may identify a body part (e.g., stomach) on which the graphic image 1015 is positioned.

Figure 10B:
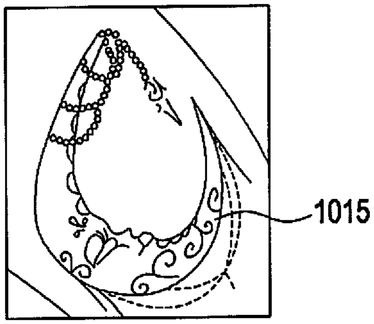

As illustrated in FIG. 10B, the processor may set a desired area in the graphic image 1015. The processor may analyze the set area of the graphic image 1015 and may obtain specific graphic information, such as curvature information and a color.

Figure 10C:
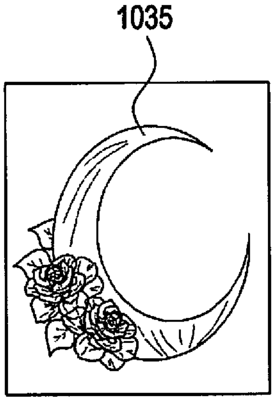

As illustrated in FIG. 10C, the processor may correct the graphic image 1015 based on the specific graphic information, thereby generating a 2D graphic image 1035.

Figure 10D:
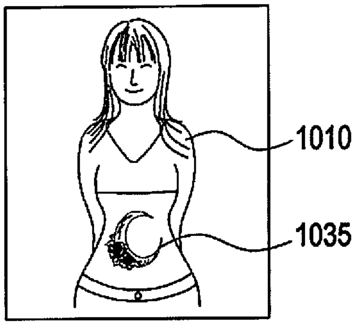

As illustrated in FIG. 10D, the processor may apply the 2D graphic image 1035 to a portion of a 3D avatar 1010 corresponding to the body part (e.g., stomach) on which the graphic image 1015 is positioned and may display the 3D avatar 1010.

Figure 11A:
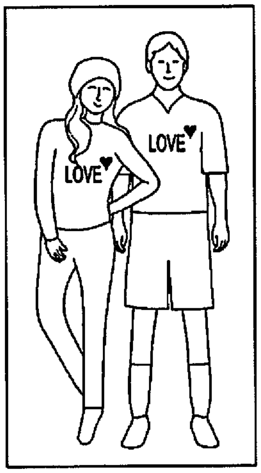
FIGS. 11A-11D illustrate an operation of an electronic device controlling a graphic object, according to an embodiment.

FIG. 11A to FIG. 110D illustrate an operation of an electronic device controlling a graphic object according to various embodiments. The graphic object control operation may be performed by at least one of an electronic device and at least one processor of the electronic device.

As illustrated in FIG. 11A, the processor may identify a graphic image 1025 in an image using an object analysis algorithm and may identify a body part (e.g., chest) on which the graphic image 1115 is positioned.

Figure 11B:
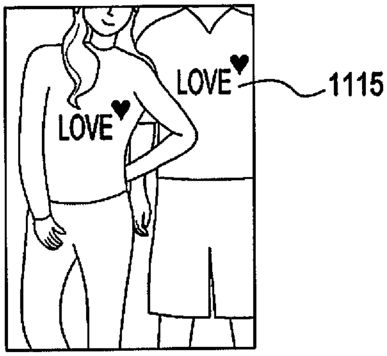

As illustrated in FIG. 11B, the processor may set a desired area in the graphic image 1115. The processor may analyze the set area of the graphic image 1115 and may obtain specific graphic information, such as curvature information and a color.

Figure 11C:
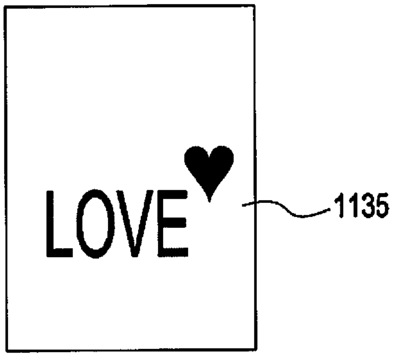

As illustrated in FIG. 11C, the processor may correct the graphic image 1115 based on the specific graphic information, thereby generating a 2D graphic image 1135.

Figure 11D:
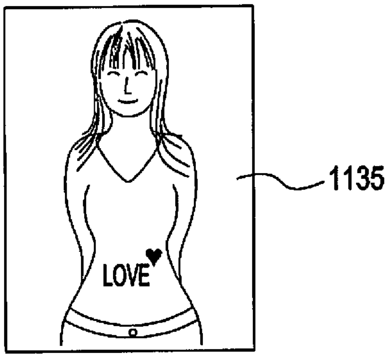

As illustrated in FIG. 11D, the processor may apply the 2D graphic image 1135 to a portion of a 3D avatar 1110 corresponding to the body part (e.g., stomach) on which the graphic image 1115 is positioned and may display the 3D avatar 1110.

Figure 12:
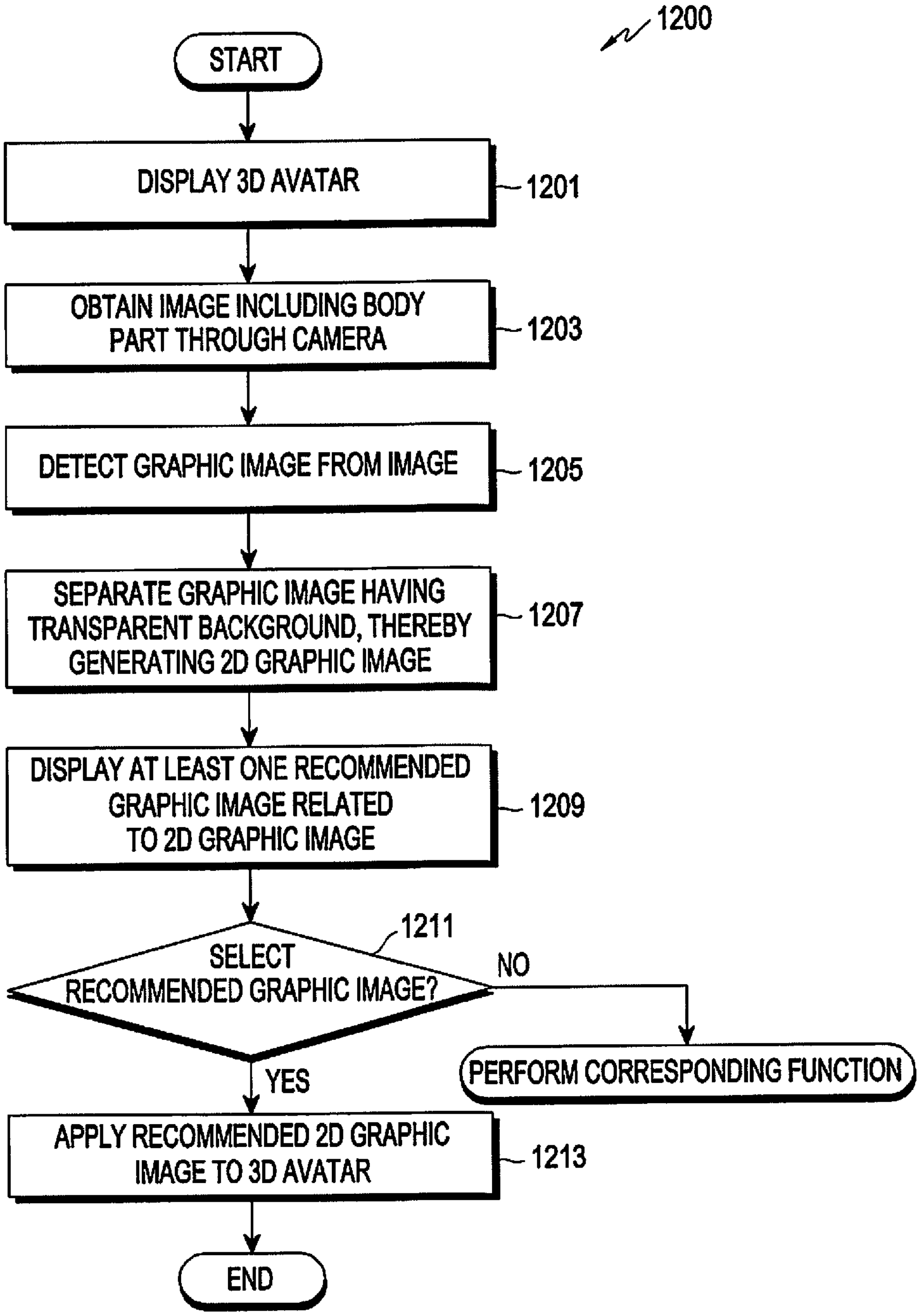
FIG. 12 is a flowchart illustrating an operation of an electronic device controlling a graphic object, according to an embodiment.

FIG. 12 is a flowchart 1200 illustrating an operation of an electronic device controlling a graphic object, according to an embodiment. A graphic object control method may include step 1201 to step 1213. The graphic object control method may be performed by at least one of an electronic device and at least one processor of the electronic device.

In step 1201, the processor displays a 3D avatar representing a user of the electronic device on a display 260.

In step 1203, the processor obtains an image including a body part using a camera 210. When the user selects personalization item generation while the 3D avatar is being displayed on the display 260, the processor may activate the camera and may capture an image.

In step 1205, the processor detects, using an object analysis algorithm, a graphic image drawn on the body part from the image obtained using the camera 210. The processor may detect the distribution of skin color and the curvature of a line from the image using an object analysis algorithm, and may determine that the body part is the left arm based on the detected distribution of the skin color and the detected curvature of the line. The processor may analyze a tattoo drawn on the left arm of the body using the object analysis algorithm to detect the line drawing of the tattoo and may determine a graphic image based on the detected line drawing.

In step 1207, the processor analyzes the determined graphic image and separates an image having a transparent background, thereby generating a 2D graphic image. The processor may generate the 2D graphic image as a PNG file to make the background of the 2D graphic image transparent.

In step 1209, the processor provides at least one recommended graphic image related to the 2D graphic image.

When a recommended graphic image is selected by the user among the at least one recommended graphic image in step 1211, the processor applies the recommended graphic image to a portion of the 3D avatar corresponding to the body part and may display the 3D avatar in step 1213. The processor may apply the recommended graphic image to the left arm of the 3D avatar and may display the 3D avatar.

When no recommended graphic image is selected by the user among the at least one recommended graphic image in step 1211, the processor performs a different function related to the at least one recommended graphic image.

FIGS. 13A-13H illustrate an operation of an electronic device controlling a graphic object, according to an embodiment. The graphic object control operation may be performed by at least one of an electronic device and at least one processor of the electronic device.

Figure 13A:
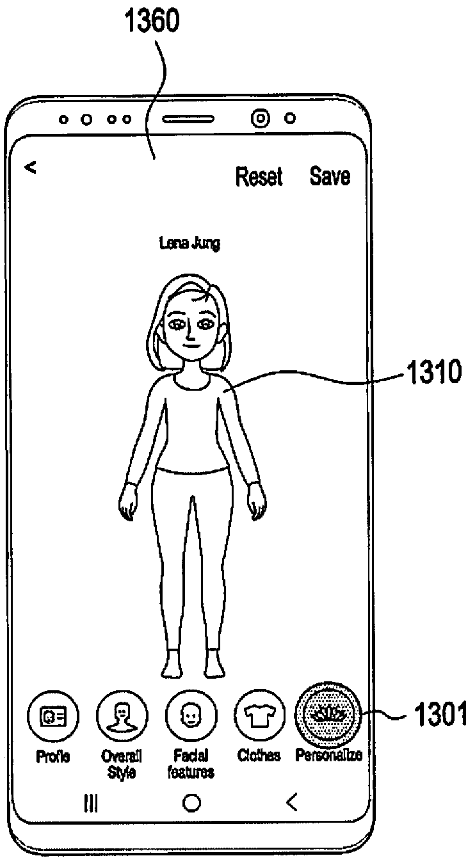
FIGS. 13A-13H illustrate an operation of an electronic device controlling a graphic object, according to an embodiment.

As illustrated in FIG. 13A, the processor may display a 3D avatar 1310 representing a user of the electronic device on a display 1360. When receiving an input through a personalization generation button 1301 by the user while the 3D avatar 1310 is being displayed on the display 1360, the processor may activate a camera 210.

Figure 13B:
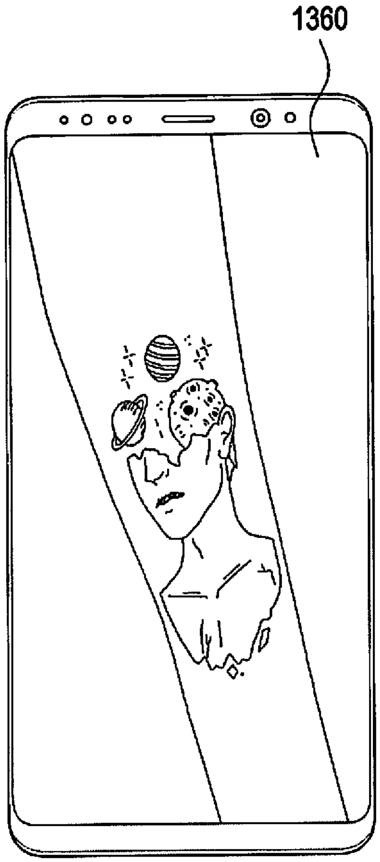

As illustrated in FIG. 13B, the processor may obtain an image including a body part using the camera 210.

Figure 13C:
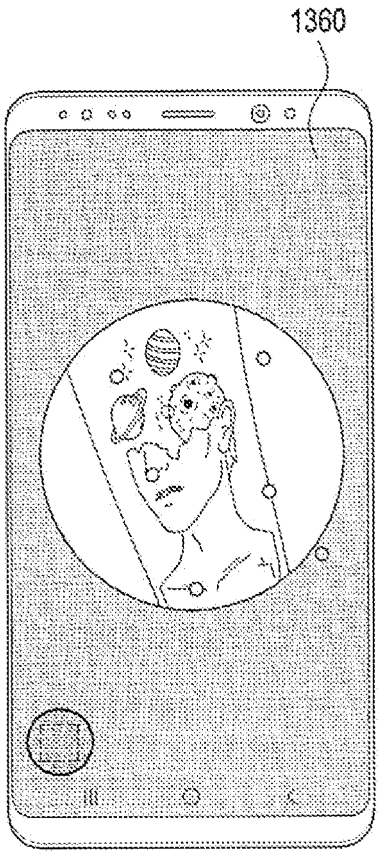

As illustrated in FIG. 13C, the processor may detect the distribution of skin color and the curvature of a line from the image using an object analysis algorithm, and may determine that the body part is the left arm based on the detected distribution of the skin color and the detected curvature of the line. The processor may analyze a tattoo drawn on the left arm of the body using the object analysis algorithm to detect the line drawing of the tattoo and may determine a graphic image based on the detected line drawing. The processor may determine a graphic image included in an area selected by the user in the image. The processor may analyze the determined graphic image and may separate an image having a transparent background, thereby generating a 2D graphic image. For example, the processor may generate the 2D graphic image as a PNG file to make the background of the 2D graphic image transparent.

Figure 13D:
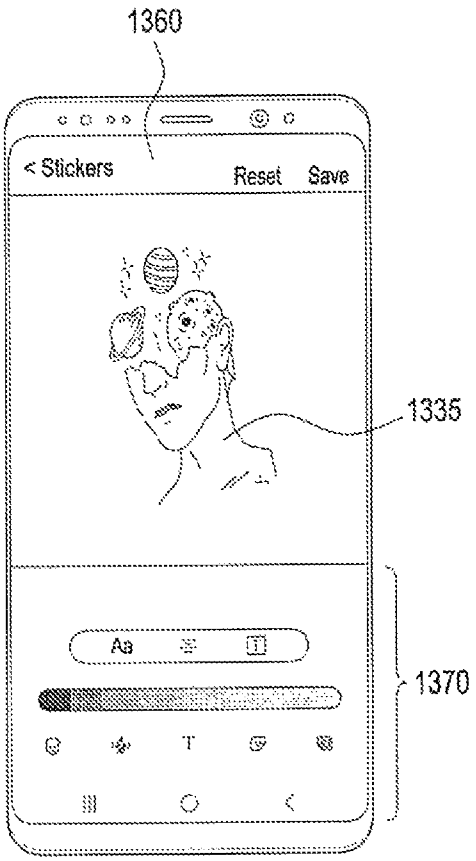

As illustrated in FIG. 13D, the processor may provide an edit menu 1370 for editing the 2D graphic image 1335. The user may edit the 2D graphic image 1335 to be more similar to the drawn tattoo in the image using the edit menu. The processor may provide, as a recommended graphic image, at least one 2D graphic image related to the 2D graphic image 1335 among 2D graphic images stored in a memory 230 or a server 108.

Figure 13E:
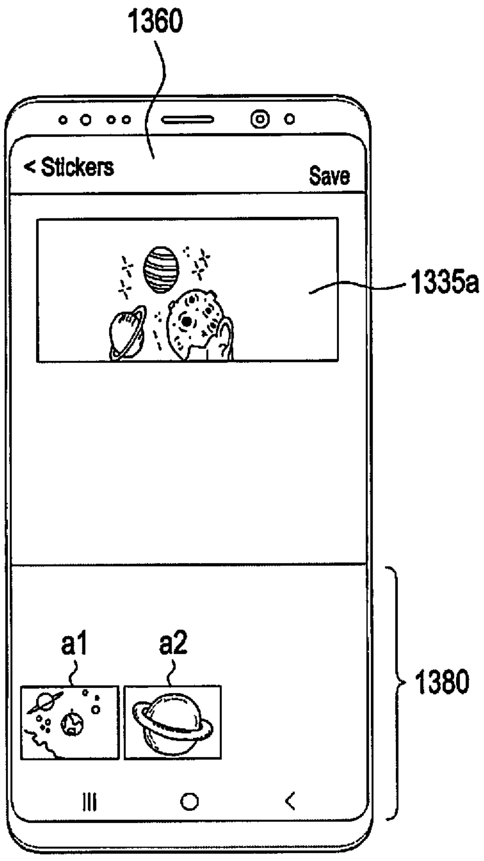

As illustrated in FIG. 13E, when a partial graphic image 1335*a* of the 2D graphic image 1335 is selected, the processor may provide, as a recommended graphic image a1 and a2, at least one 2D graphic image related to the partial graphic image 1335*a* of the 2D graphic image 1335 among the 2D graphic images stored in the memory 230 or the server 108.

Figure 13F:
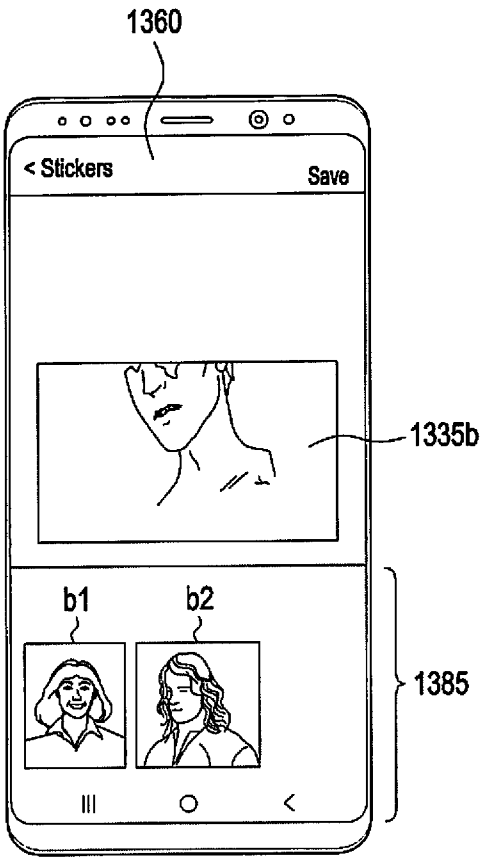

As illustrated in FIG. 13F, when a partial graphic image 1335*b* of the 2D graphic image 1335 is selected, the processor may provide, as a recommended graphic image b1 and b2, at least one 2D graphic image related to the partial graphic image 1335*b* of the 2D graphic image 1335 among the 2D graphic images stored in the memory 230 or the server 108.

Figure 13G:
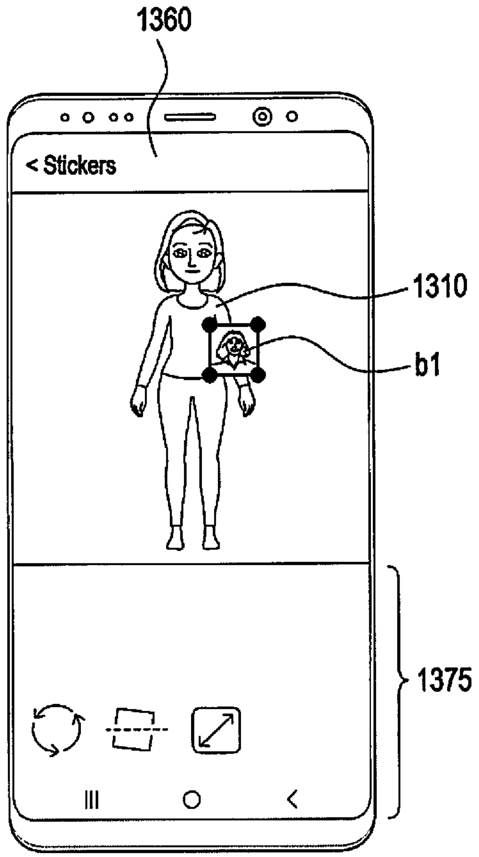

As illustrated in FIG. 13G, the processor may apply a recommended graphic image b1 selected by the user to the left arm of the 3D avatar 1310 and may display the 3D avatar 1310. The processor may provide an edit menu 1375 for editing the recommended graphic image b1 applied to the left arm of the 3D avatar 1310. The user may edit the curvature degree or rotations of the recommended graphic image b1 applied to a top of the 3D avatar 1310 using the edit menu 1375 to apply the recommended graphic image b1 according to the curvature of the arm of the 3D avatar 1310 and may display the 3D avatar. When the 3D avatar 1310 is currently wearing a 3D graphic object corresponding to a long-sleeved top, the processor may display a pop-up window to ask whether to change to a 3D graphic object corresponding to a top that exposes the arm.

Figure 13H:
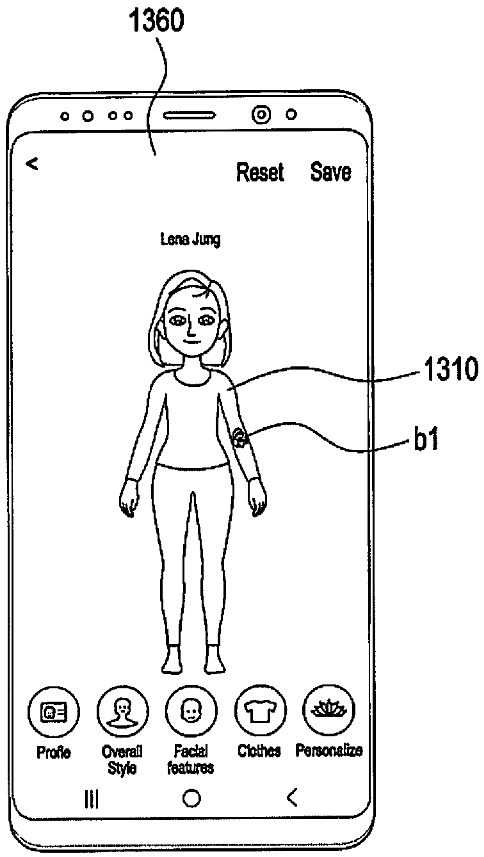

As illustrated in FIG. 13H, when an edit is completed, the processor may apply the recommended graphic image b1 to the left arm of the 3D avatar 1310 and may display the 3D avatar 1310 on the display 1360. The processor may store the recommended graphic image b1 as a personalization item of the 3D avatar 1310.

FIGS. 14A-14H illustrate an operation of an electronic device controlling a graphic object, according to an embodiment. The graphic object control operation may be performed by at least one of an electronic device and at least one processor of the electronic device.

Figure 14A:
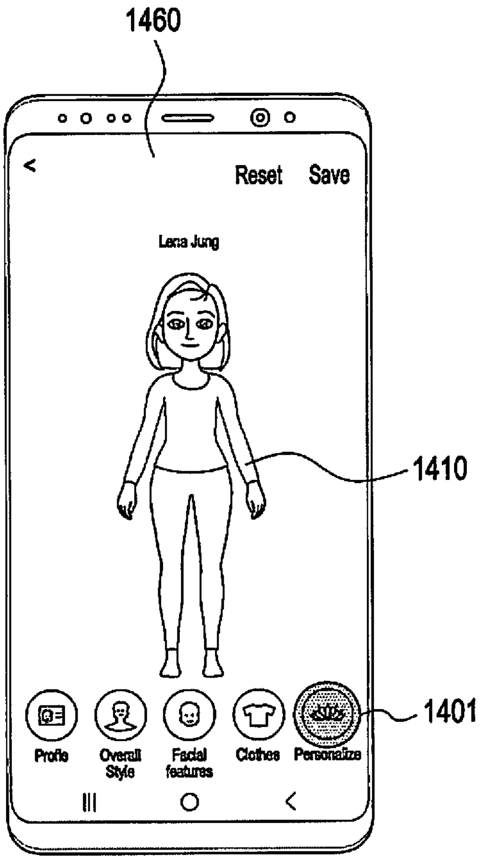
FIGS. 14A-14F illustrate an operation of an electronic device controlling a graphic object, according to an embodiment.

As illustrated in FIG. 14A, the processor may display a 3D avatar 1410 representing a user of the electronic device on a display 1460. When receiving an input through a personalization generation button 1401 by the user while the 3D avatar 1410 is being displayed on the display 1460, the processor may activate a camera 210.

Figure 14B:
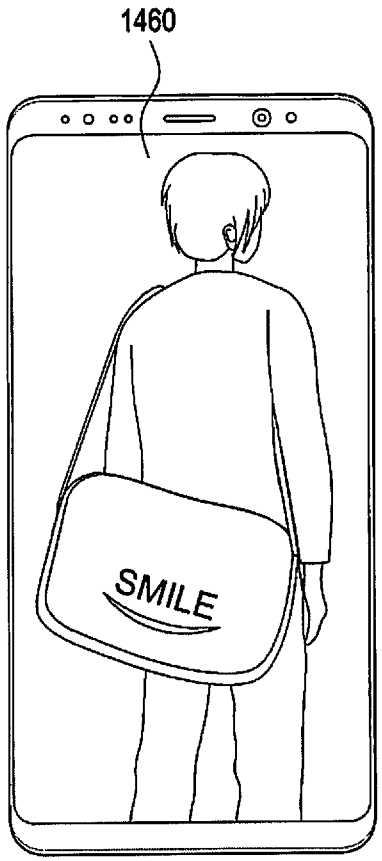

As illustrated in FIG. 14B, the processor may obtain an image including an object using the camera 210.

Figure 14C:
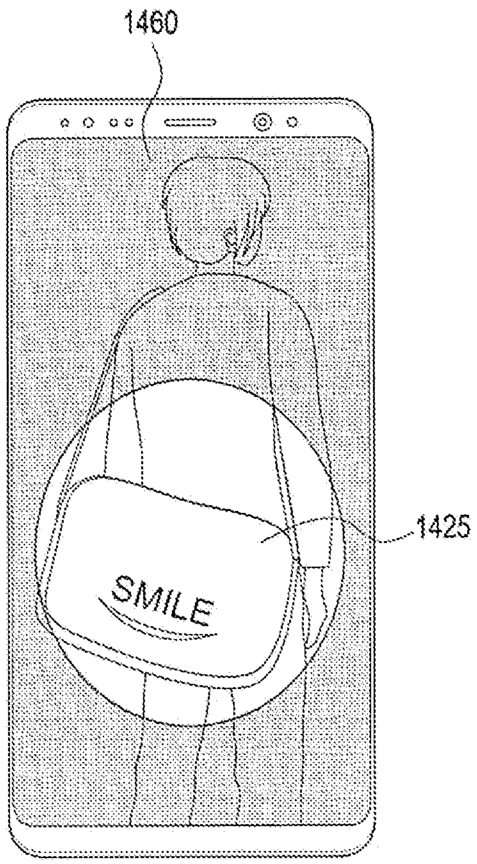

As illustrated in FIG. 14C, the processor may detect the object 1425 (e.g., a bag) included in the image using an object analysis algorithm, may detect a line drawing included in the object 1425, and may determine a graphic image 1435 based on the detected line drawing. The processor may analyze the determined graphic image and may separate an image having a transparent background, thereby generating the 2D graphic image 1435. For example, the processor may generate the 2D graphic image as a PNG file to make the background of the 2D graphic image 1435 transparent.

Figure 14D:
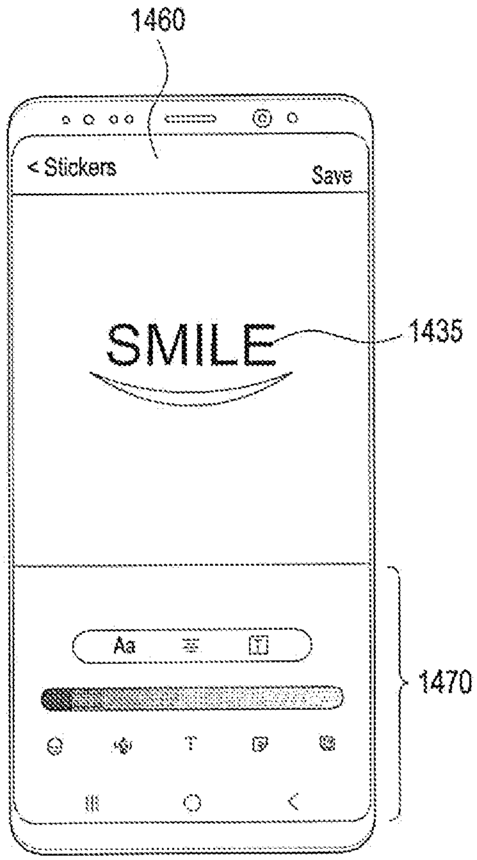

As illustrated in FIG. 14D, the processor may provide an edit menu 1472 for editing the 2D graphic image 1435. The user may edit the 2D graphic image 1435 to be more similar to a logo drawn in the image using the edit menu.

Figure 14E:
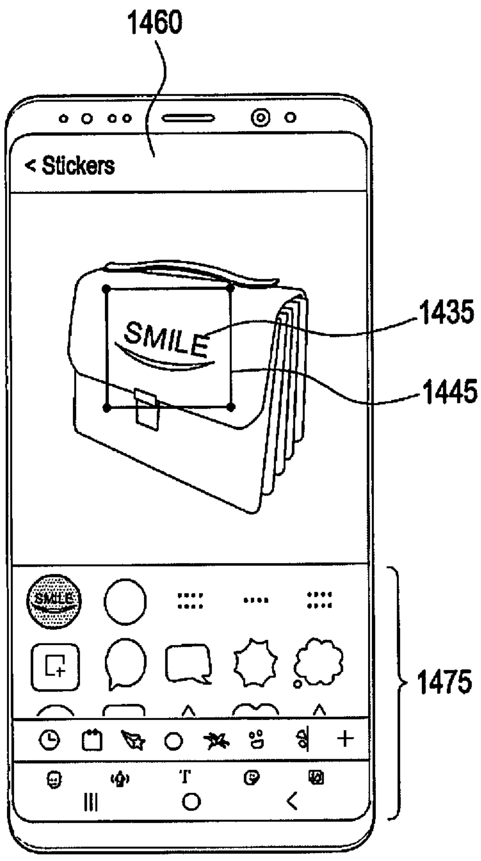

As illustrated in FIG. 14E, the processor may apply the 2D graphic image 1435 to a 3D graphic object 1445 selected by the user among 3D graphic objects stored in a memory 230 or a server 108 and may display the 3D graphic object 1445. The processor may provide an edit menu 1475 for editing the 2D graphic image 1435 applied to the 3D graphic object 1445. The user may adjust the size of the 2D graphic image 1435 on the 3G graphic object 1445 or may change the position of the 2D graphic image 1435 on the 3G graphic object 1445 using the edit menu 1475.

Figure 14F:
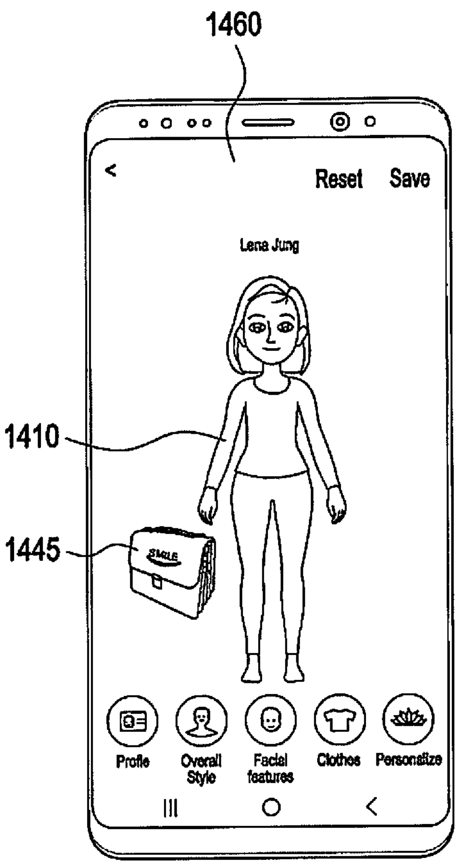

As illustrated in FIG. 14F, the processor may apply the 3D graphic object 1445, into which the 2D graphic image 1435 is inserted, to the 3D avatar 1410 and may display the 3D avatar 1410. The processor may store the 3D graphic object 1445 into which the 2D graphic image 1435 is inserted as a personalization item of the 3D avatar 1410.

Figure 15:
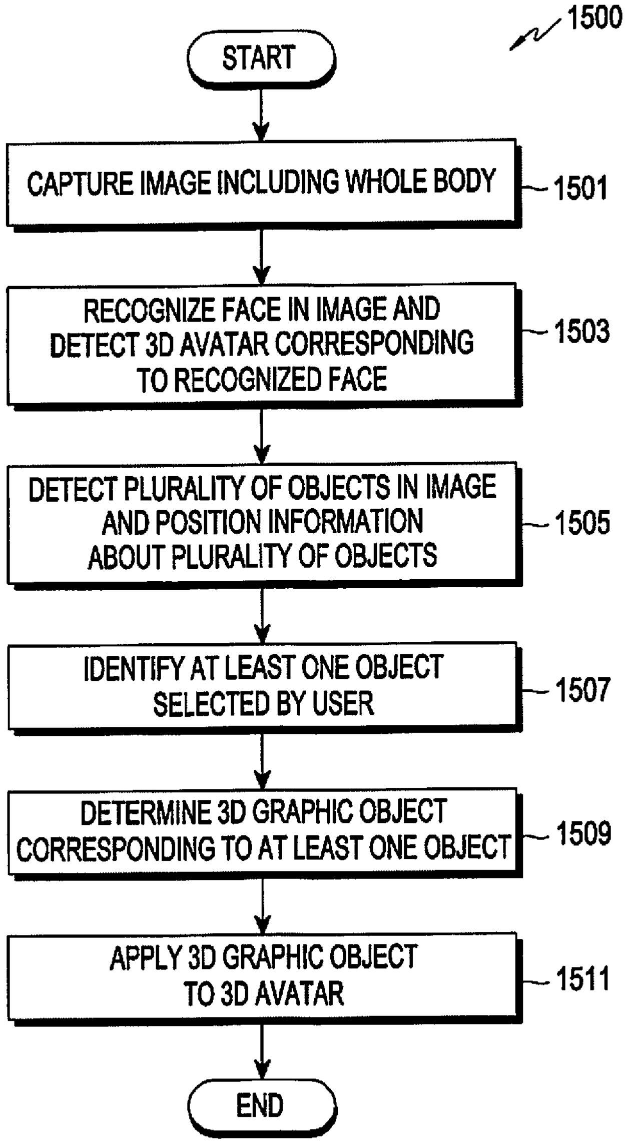
FIG. 15 is a flowchart illustrating an operation of an electronic device controlling a graphic object, according to various embodiments.

FIG. 15 is a flowchart 1500 illustrating an operation of an electronic device controlling a graphic object, according to an embodiment. A graphic object control method may include step 1501 to step 1511. The graphic object control method may be performed by at least one of an electronic device and at least one processor of the electronic device.

In step 1501, the processor obtains an image including a whole body using a camera 210. Additionally or alternatively, the processor may obtain the image including the whole body stored in a memory 230.

In step 1503, the processor recognizes a face in the image using a face recognition algorithm and detects a 3D avatar corresponding to the recognized face among a plurality of 3D avatars stored in the memory 230.

In step 1505, the processor detects a plurality of objects in the image and position information about each of the plurality of objects using an object analysis program. The processor may display the plurality of objects in an area such that a user can select the plurality of detected objects.

In step 1507, the processor identifies at least one object selected by the user from among the plurality of objects.

In step 1509, the processor may determine at least one 3D graphic object corresponding to category information and attribute information about the at least one object among 3D graphic objects stored in the memory 230 or a server 108.

In step 1511, the processor applies the determined at least one 3D graphic object to the position of the 3D avatar corresponding to position information about the at least one 3D graphic object and displays the 3D avatar.

FIGS. 16A-16H illustrate an operation of an electronic device controlling a graphic object, according to an embodiment. The graphic object control operation may be performed by at least one of an electronic device and at least one processor of the electronic device.

Figure 16A:
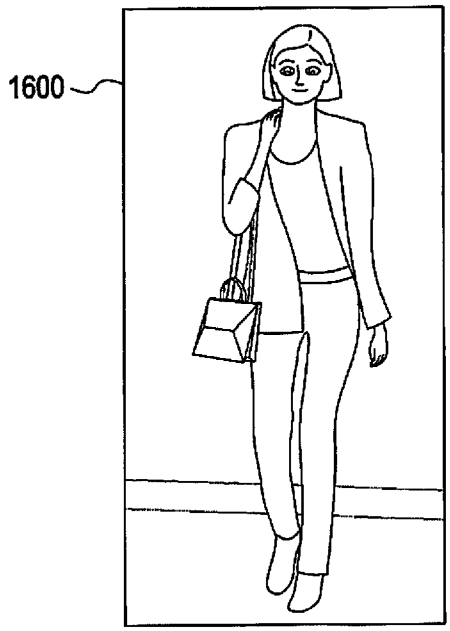
FIGS. 16A-16F illustrate an operation of an electronic device controlling a graphic object, according to an embodiment.

As illustrated in FIG. 16A, the processor may obtain an image 1600 including a whole body from a camera 210 or a memory 230.

Figure 16B:
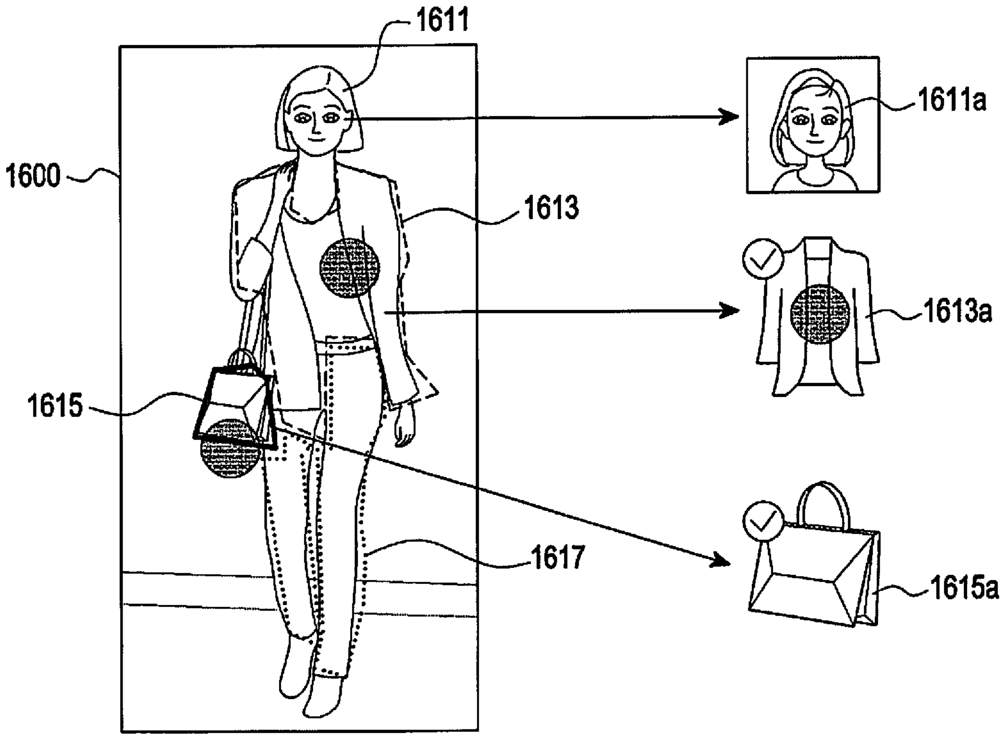

As illustrated in FIG. 16B, the processor may recognize a face using a face recognition algorithm and may detect a 3D avatar 1611*a* corresponding to the recognized face 1611 among a plurality of 3D avatars stored in the memory 230. The processor may detect a plurality of objects 1613, 1615, and 1617 corresponding to items (e.g., clothes and a bag) worn on the body using an object analysis algorithm and may display the plurality of objects 1613, 1615, and 1617 as an area selectable by a user. When two objects 1613 and 1615 are selected by the user from among plurality of objects, the processor may determine two 3D graphic objects 1613*a* and 1615*b* corresponding to category information and attribute information about the two objects 1613 and 1615 selected by the user among a plurality of 3D graphic objects stored in the memory 230 or a server 108 and position information about the two 3D graphic objects 1613*a* and 1615*b*. The processor may apply the two 3D graphic objects 1613*a* and 1615*b* to the 3D avatar 1611*a* and may display the 3D avatar 1611*a*.

Figure 16C:
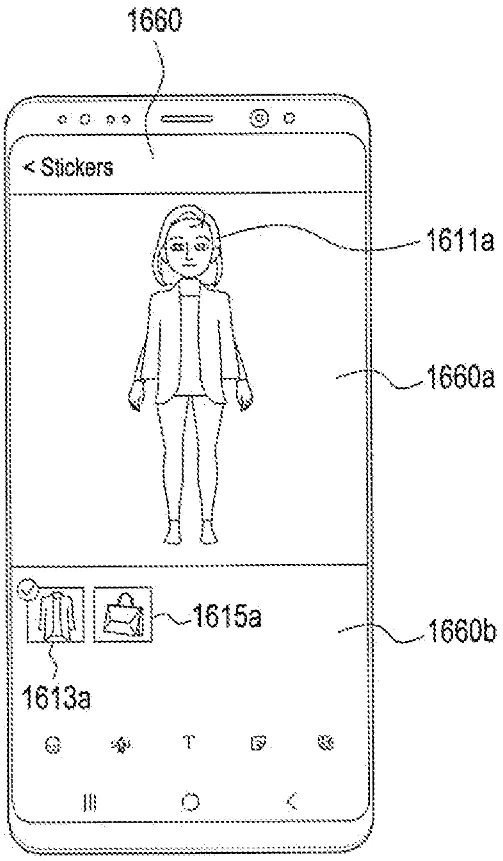

As illustrated in FIG. 16C, the processor may display the 3D avatar 1611*a* in a first area 1660*a* of a display 1660 and may display the two 3D graphic objects 1613*a* and 1615*b* in a second area 1660*b* of the display 1660. When a 3D graphic object 1613*a* corresponding to clothes in the second area 1660*b* of the display is selected, the processor may apply the selected 3D graphic object 1613*a* corresponding to the clothes to the 3D avatar 161 1a and may display the 3D avatar 1611*a* in the first area 1660*a* of the display, based on category information and attribute information about the 3D graphic object 1613*a* or position information about the 3D graphic object 1613*a*.

Figure 16D:
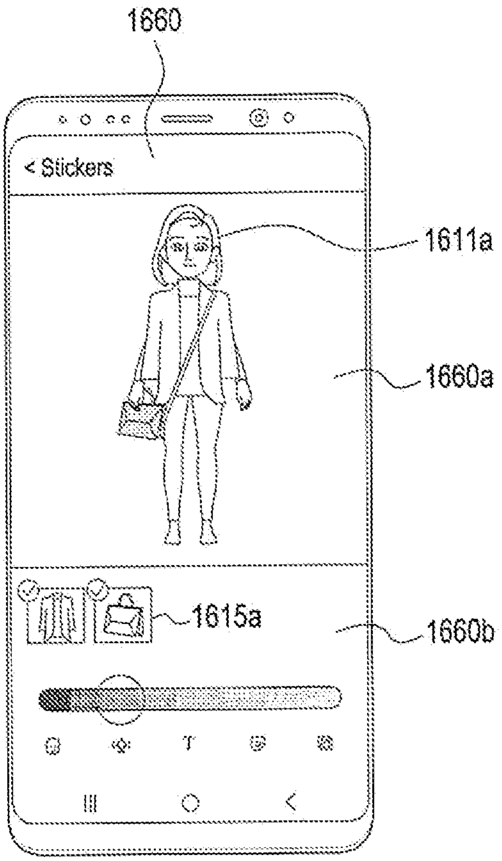

As illustrated in FIG. 16D, when a 3D graphic object 1615*a* corresponding to a bag in the second area 1660*b* of the display is selected, the processor may apply the selected 3D graphic object 1615*a* corresponding to the bag to the 3D avatar 1611*a* and may display the 3D avatar 1611*a* in the first area 1660*a* of the display, based on category information and attribute information about the 3D graphic object 1615*a* or position information about the 3D graphic object 1615*a*.

Figure 16E:
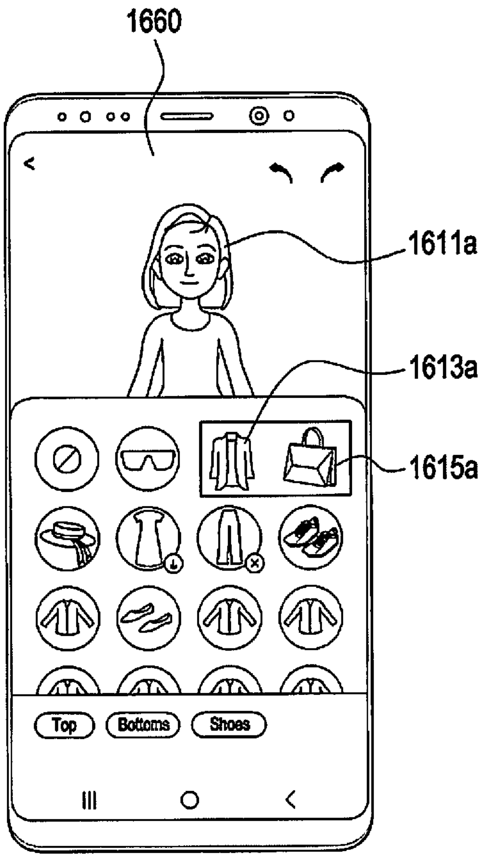

As illustrated in FIG. 16E, the processor may store the two 3D graphic objects 1613*a* and 1615*b* as personalization items of the 3D avatar 1611*a*.

Figure 16F:
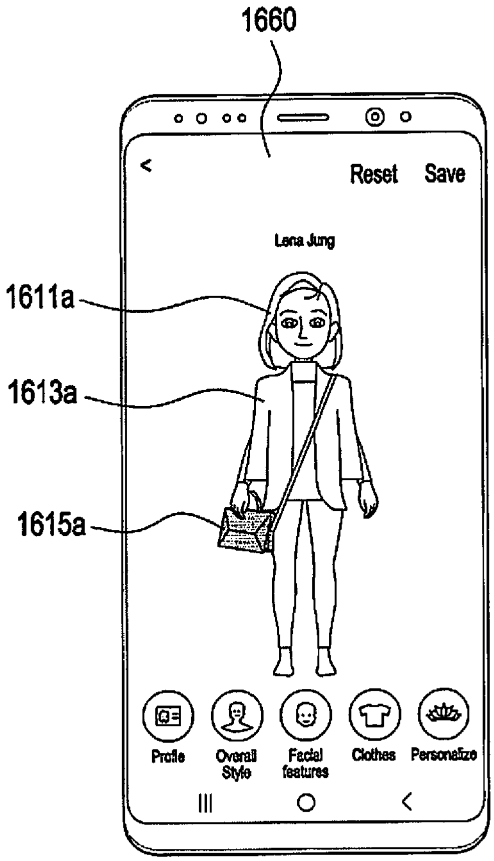

As illustrated in FIG. 16F, the processor may apply, without change, the 3D graphic objects 1613*a* and 1615*b* corresponding to items that the user is wearing to the 3D avatar 1611*a* representing the user and may display the 3D avatar 1611*a* on the display 1660.

Figure 17:
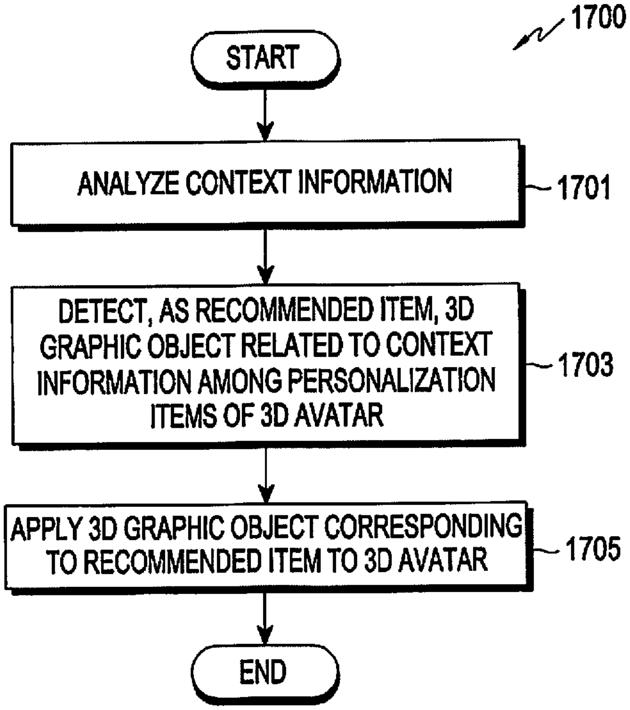
FIG. 17 is a flowchart illustrating an operation of an electronic device controlling a graphic object, according to an embodiment.

FIG. 17 is a flowchart 1700 illustrating an operation of an electronic device controlling a graphic object, according to an embodiment. A graphic object control method may include step 1701 to step 1705. The graphic object control method may be performed by at least one of an electronic device and at least one processor of the electronic device.

In step 1701, the processor analyzes context information about the electronic device. The processor may obtain context information through at least one application configured by a user among a plurality of applications installed in the electronic device in order to analyze the context information about the electronic device.

When an avatar recommendation according to weather information is selected by the user, the processor may identify the weather information for the current day as the context information in connection with a weather application.

When an avatar recommendation according to schedule information is selected by the user, the processor may identify schedule information for the current day as the context information in connection with a schedule application.

In step 1703, the processor detects a 3D graphic object corresponding to a recommended item related to the context information among personalization items of a 3D avatar representing the user of the electronic device.

The processor may identify the weather information for the current day (e.g., rain) in connection with the weather application and may change and display a background screen (e.g., a rainy background screen) on which the 3D avatar representing the user is displayed, based on the identified weather information for the current day. The processor may detect a 3D graphic object (e.g., a raincoat or an umbrella) corresponding to an item that is recommendable based on the weather information among the personalization items of the 3D avatar.

The processor may identify the schedule information for the current day (e.g., "going to ski") in connection with the schedule application and may detect a 3D graphic object (e.g., skiwear) corresponding to an item recommendable based on the schedule information among the personalization items of the 3D avatar representing the user.

In step 1705, the processor applies the detected 3D graphic object to the 3D avatar and may display the 3D avatar on a display 260.

The processor may apply the 3D graphic object (e.g., the raincoat or the umbrella) detected based on the weather information for the current day (e.g., rain), identified in connection with the weather application to the 3D avatar and may display the 3D avatar.

The processor may apply the 3D graphic object detected based on the schedule information for the current day (e.g., "going to ski") identified in connection with the schedule application to the 3D avatar and may display the 3D avatar.

Figure 18A:
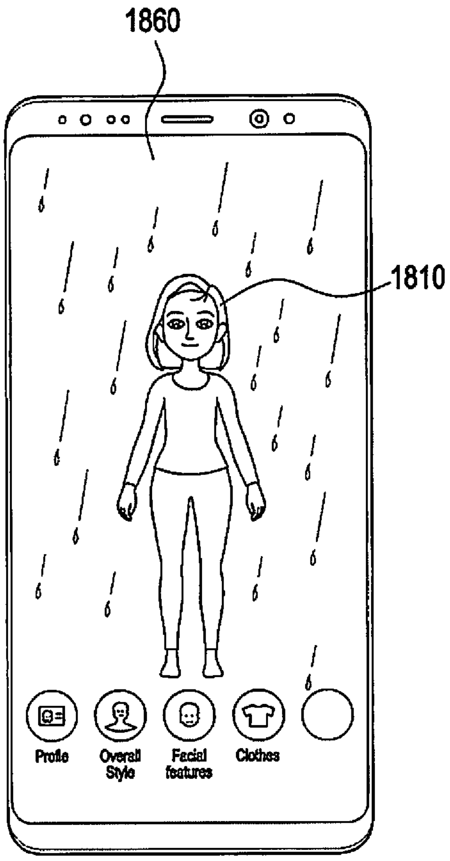
FIGS. 18A-18C illustrate an operation of an electronic device controlling a graphic object, according to an embodiment.
Figure 18B:
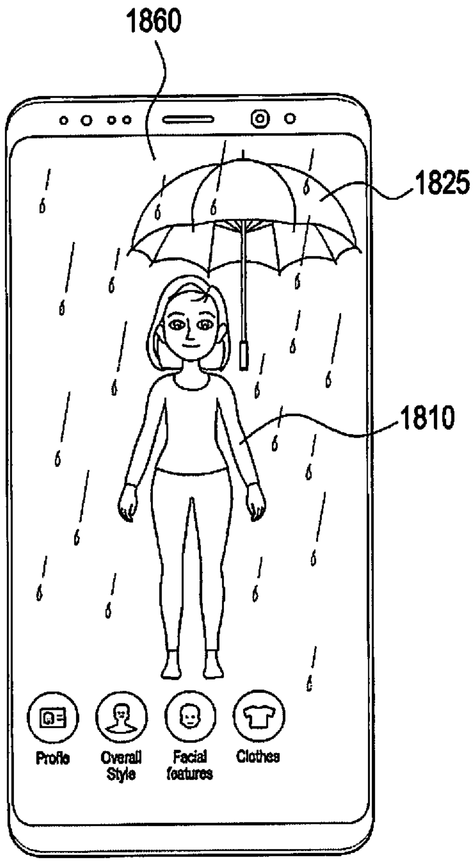
Figure 18C:
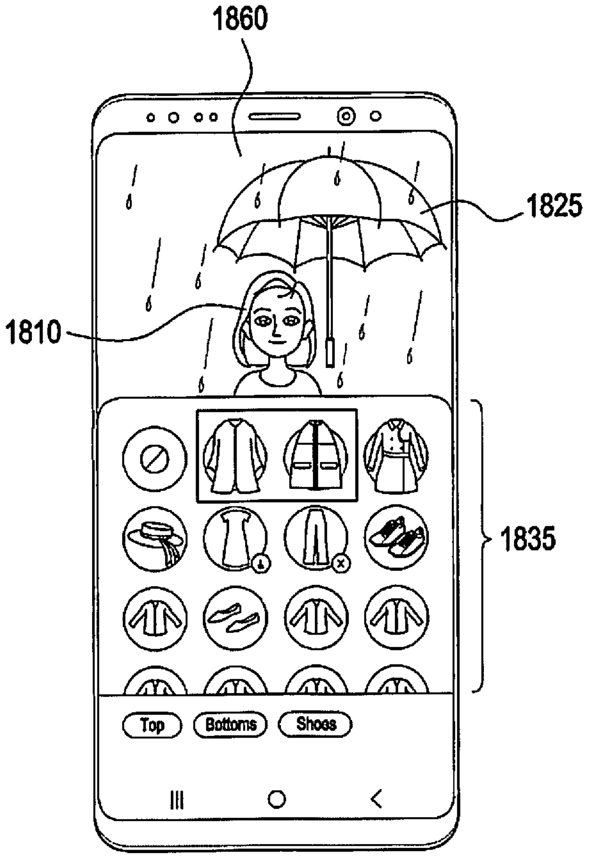

FIGS. 18A-18C illustrate an operation of an electronic device controlling a graphic object, according to an embodiment. The graphic object control operation may be performed by at least one of an electronic device and at least one processor of the electronic device.

As illustrated in FIG. 18A, when an avatar recommendation according to weather information is selected by a user, the processor may identify the weather for the current day in connection with a weather application. When the identified weather for the current day is identified as "rainy weather", the processor 220 may change a background screen on a display 1860 on which a 3D avatar 1810 is displayed to a rainy background screen and may display the rainy background screen.

As illustrated in FIG. 18B, the processor may apply a 3D graphic object 1825 corresponding to a recommended item to the 3D avatar 1810 in the rainy background screen on the display 1860 and may display the 3D avatar 1810.

As illustrated in FIG. 18C, the processor may provide a list 1835 of a plurality of 3D graphic objects recommendable for rainy weather among personalization items of the 3D avatar 1810.

Figure 19A:
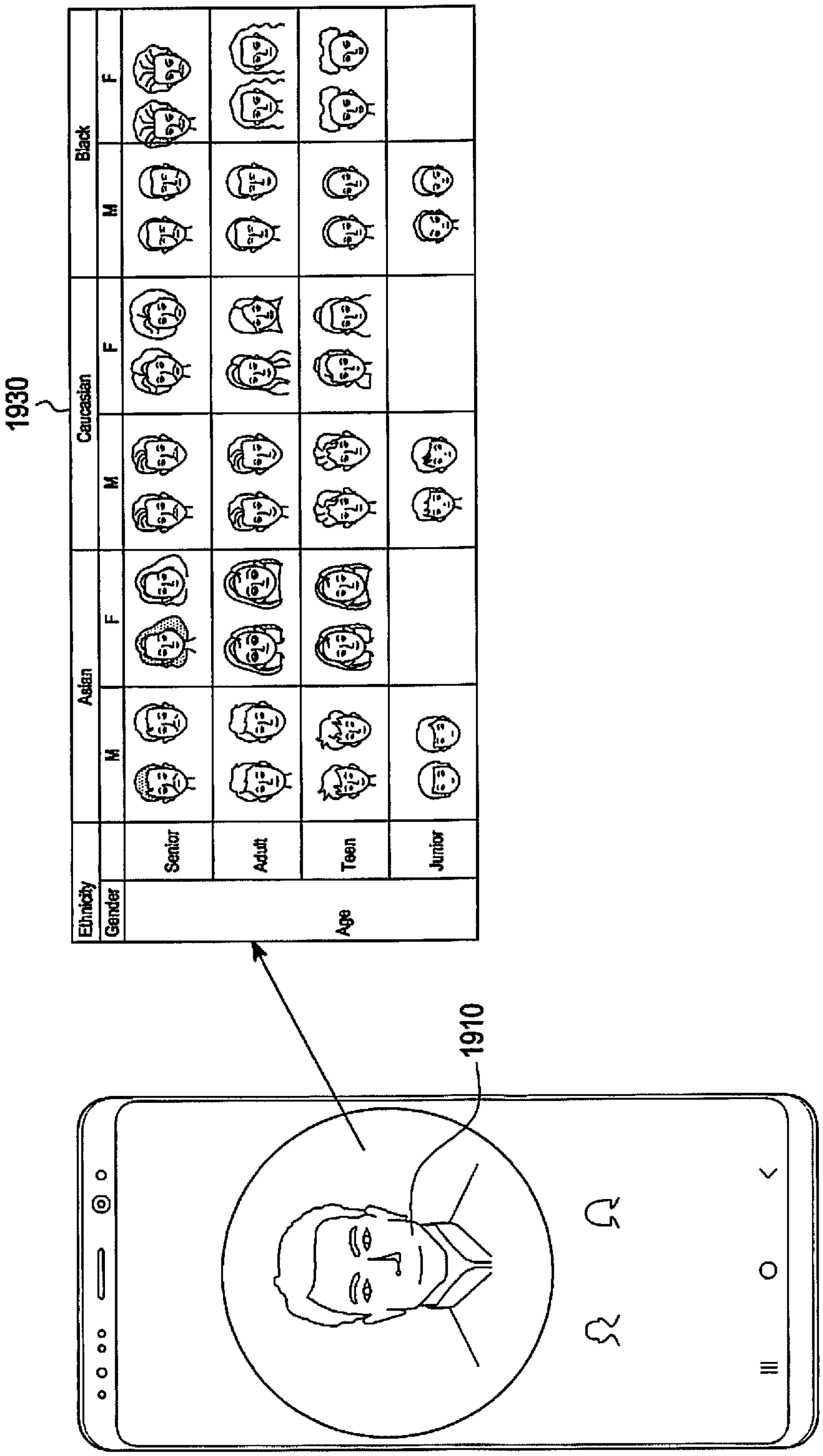
FIGS. 19A-19B illustrate an operation of an electronic device controlling a graphic object, according to an embodiment.
Figure 19B:
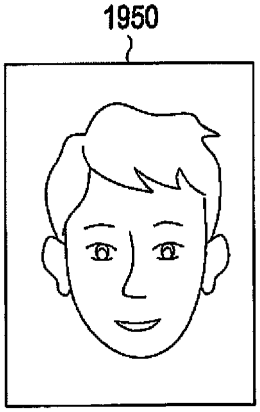

FIGS. 19A-19B illustrate an operation of an electronic device controlling a graphic object, according to an embodiment. The graphic object control operation may be performed by at least one of an electronic device and at least one processor of the electronic device.

As illustrated in FIG. 19A, the processor may obtain an image including a face received through a camera 210. The processor may recognize a face 1910 in the image using a face recognition algorithm. The processor may detect age information, gender information, and race information based on the recognized face or information input by a user. The processor may detect a face of a 3D avatar satisfying the detected age information, gender information, and race information in a face DB 1930 stored in a memory 230 or a server 108.

As illustrated in FIG. 19B, the processor may generate a 3D avatar 1950 based on the detected face of the 3D avatar detected from the face DB 1930 stored in the memory 230 or the server 108.

According to various embodiments, a graphic object control method of an electronic device may include obtaining an image using a camera, determining a 3D graphic object corresponding to an object included in the obtained image, and applying the determined 3D graphic object to a 3D avatar to display the 3D avatar.

The graphic object control method may further include editing the 3D graphic object in the state in which the 3D graphic object is applied to the 3D avatar.

The graphic object control method may further include storing the 3D graphic object as a personalization item of the 3D avatar.

The graphic object control method may further include obtaining the image using the camera when personalization item generation is selected in the state in which the 3D avatar is displayed.

The graphic object control method may further include detecting a 2D graphic image from an image comprising a body part when obtaining the image using the camera; and applying the 2D graphic image to a portion of the 3D avatar corresponding to the body part to display the 3D avatar.

The graphic object control method may further include displaying at least one recommended graphic image related to the 2D graphic image and applying a recommended graphic image selected by a user to the portion of the 3D avatar corresponding to the body part to display the 3D avatar.

The graphic object control method may further include recognizing a face from an image including a whole body when obtaining the image using the camera, determining a 3D avatar corresponding to the recognized face, determining a plurality of objects in the image and position information about each of the plurality of objects, determining a plurality of 3D graphic objects corresponding to the plurality of objects, and applying the plurality of 3D graphic objects to a position of the 3D avatar corresponding to the position information about each of the plurality of objects to display the 3D avatar.

The graphic object control method may further include storing the plurality of 3D graphic objects as personalization items of the 3D avatar.

The graphic object control method may further include analyzing context information, determining, as a recommended item, a 3D graphic object related to the context information among personalization items of the 3D avatar, and displaying the 3D graphic object determined as the recommended item.

The graphic object control method may further include applying the 3D graphic object determined as the recommended item to the 3D avatar to display the 3D avatar.

A storage medium may store commands, wherein the commands may be configured for at least one processor to perform at least one operation when executed by the at least one processor, and the at least one operation may include obtaining an image using the camera, determining a 3D graphic object corresponding to an object included in the obtained image, and applying the determined 3D graphic object to a 3D avatar to display the 3D avatar.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. An electronic device comprising:
a camera;
a display;
a processor; and
memory storing instructions that, when executed by the processor, cause the electronic device to:
obtain an image using the camera;
analyze an object comprised in the obtained image to detect category information and attribute information about the object to identify a type of the object;
determine a two-dimensional (2D) icon indicating the type of the object corresponding to the category information;
determine a first three-dimensional (3D) graphic object corresponding to the attribute information;
simultaneously display the 2D icon indicating the type of the object and the obtained image;
apply the first 3D graphic object to a 3D avatar to display the 3D avatar;

while the 3D avatar is being displayed on the display, obtain the image using the camera when a personalization item generation is selected with the displayed 3D avatar:

store the first 3D graphic object without the 3D avatar, as a personalization item of the 3D avatar;

analyze context information that can be identified in connection with a plurality of applications of the electronic device;

determine, as a recommended item, a second 3D graphic object related to the context information among personalization items of the 3D avatar;

display the second 3D graphic object determined as the recommended item:

apply the second 3D graphic object determined as the recommended item to the 3D avatar to display the 3D avatar; and change and display a background screen of the 3D avatar based on the context information.

2. The electronic device of claim 1, wherein the instructions, when executed by the processor, cause the electronic device to:

detect a 2D graphic image from an image comprising a body part when obtaining the image using the camera; and apply the 2D graphic image to a portion of the 3D avatar corresponding to the body part to display the 3D avatar.

3. The electronic device of claim 2, wherein the instructions, when executed by the processor, cause the electronic device to:

display at least one recommended graphic image related to the 2D graphic image; and apply a recommended graphic image selected by a user to the portion of the 3D avatar corresponding to the body part to display the 3D avatar.

4. The electronic device of claim 1, wherein the instructions, when executed by the processor, cause the electronic device to:

recognize a face when obtaining the image using the camera, wherein the image comprises a whole body;

determine the 3D avatar corresponding to the recognized face;

determine a plurality of objects in the image and position information about each of the plurality of objects;

determine a plurality of 3D graphic objects corresponding to the plurality of objects; and apply the plurality of 3D graphic objects to a position of the 3D avatar corresponding to the position information about each of the plurality of objects to display the 3D avatar.

5. The electronic device of claim 4, wherein the instructions, when executed by the processor, cause the electronic device to store the plurality of 3D graphic objects as the personalization items of the 3D avatar.

6. The electronic device of claim 1, wherein the processor is further configured to:

identify the object comprised in the obtained image based on a selection by a user.

7. The electronic device of claim 1, wherein the first 3D graphic object applied to the 3D avatar is displayed at a location of the 3D avatar that is selected by a user.

8. A graphic object control method of an electronic device, the method comprising:

obtaining an image using a camera;

analyzing an object comprised in the obtained image to detect category information and attribute information about the object to identify a type of the object;

determining a two-dimensional (2D) icon indicating the type of the object corresponding to the category information;

determining a first three-dimensional (3D) graphic object corresponding to the attribute information;

simultaneously displaying the 2D icon indicating the type of the object and the obtained image;

applying the determined 3D graphic object to a 3D avatar to display the 3D avatar;

while the 3D avatar is being displayed on the display, obtaining the image using the camera when a personalization item generation is selected with the displayed 3D avatar:

storing the 3D graphic object without the 3D avatar, as a personalization item of the 3D avatar;

analyzing context information that can be identified in connection with a plurality of applications of the electronic device;

determining, as a recommended item, a second 3D graphic object related to the context information among personalization items of the 3D avatar;

displaying the second 3D graphic object determined as the recommended item;

applying the second 3D graphic object determined as the recommended item to the 3D avatar to display the 3D avatar; and changing and displaying a background screen of the 3D avatar based on the context information.

9. The graphic object control method of claim 8, further comprising:

detecting a (2D) graphic image from an image comprising a body part when obtaining the image using the camera; and applying the 2D graphic image to a portion of the 3D avatar corresponding to the body part to display the 3D avatar.

10. The graphic object control method of claim 9, further comprising:

displaying at least one recommended graphic image related to the 2D graphic image; and applying a recommended graphic image selected by a user to the portion of the 3D avatar corresponding to the body part to display the 3D avatar.

11. The graphic object control method of claim 8, further comprising:

recognizing a face when obtaining the image using the camera, wherein the image comprises a whole body;

determining the 3D avatar corresponding to the recognized face;

determining a plurality of objects in the image and position information about each of the plurality of objects;

determining a plurality of 3D graphic objects corresponding to the plurality of objects;

applying the plurality of 3D graphic objects to a position of the 3D avatar corresponding to the position information about each of the plurality of objects to display the 3D avatar; and storing the plurality of 3D graphic objects as the personalization items of the 3D avatar.

12. The graphic object control method of claim 8, further comprising:

storing the plurality of 3D graphic objects as the personalization items of the 3D avatar.

13. The graphic object control method of claim 8, further comprising:

identifying the object comprised in the obtained image based on a selection by a user.

14. The graphic object control method of claim 8, wherein the first 3D graphic object applied to the 3D avatar is displayed at a location of the 3D avatar that is selected by a user.

* * * * *